United States Patent
Yokoyama

(10) Patent No.: US 9,191,091 B2
(45) Date of Patent: Nov. 17, 2015

(54) RADIO COMMUNICATION SYSTEM USING MULTI-ANTENNA TRANSMISSION TECHNIQUE, AND MULTI-USER SCHEDULER THEREFOR

(75) Inventor: Hitoshi Yokoyama, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 13/533,454

(22) Filed: Jun. 26, 2012

(65) Prior Publication Data

US 2012/0275416 A1 Nov. 1, 2012

Related U.S. Application Data

(60) Division of application No. 12/186,209, filed on Aug. 5, 2008, now Pat. No. 8,345,641, which is a continuation of application No. PCT/JP2006/302174, filed on Feb. 8, 2006.

(51) Int. Cl.
| | |
|---|---|
| *H04W 72/04* | (2009.01) |
| *H04B 7/06* | (2006.01) |
| *H04B 7/08* | (2006.01) |
| *H04W 72/12* | (2009.01) |

(52) U.S. Cl.
CPC ............ *H04B 7/0658* (2013.01); *H04B 7/0632* (2013.01); *H04B 7/0634* (2013.01); *H04B 7/0689* (2013.01); *H04B 7/0871* (2013.01); *H04W 72/046* (2013.01); *H04W 72/1205* (2013.01)

(58) Field of Classification Search
None
See application file for complete search history.

(56) References Cited

U.S. PATENT DOCUMENTS

| | | |
|---|---|---|
| 6,473,467 B1 | 10/2002 | Wallace et al. |
| 6,584,161 B2 | 6/2003 | Hottinen et al. |
| 6,754,286 B2 | 6/2004 | Hottinen et al. |
| 6,862,271 B2 * | 3/2005 | Medvedev et al. ............ 370/329 |
| 6,888,809 B1 | 5/2005 | Foschini et al. |
| 7,693,100 B2 | 4/2010 | Cho et al. |

(Continued)

FOREIGN PATENT DOCUMENTS

| | | |
|---|---|---|
| CN | 1653721 | 8/2005 |
| EP | 1227539 | 7/2002 |

(Continued)

OTHER PUBLICATIONS

3rd Generation Partnership Project; Technical Specification Group Radio Access Network; "Multiple-Input Multiple Output in UTRA"; 3GPP TR 25.876 V2.0.0; Oct. 2005.

(Continued)

*Primary Examiner* — Rhonda Murphy
(74) *Attorney, Agent, or Firm* — Myers Wolin, LLC

(57) ABSTRACT

A transmitting station in the radio system performing scheduled transmission to a plurality of user terminals including: a plurality of antennas and a reception unit configured to obtain reception quality information estimated from a pilot channel among information fed back from each of the plurality of user terminals, to determine based on the obtained reception quality information, a transmission system for the plurality of antennas and a transmission unit configured to add a specific bit which identifies the determined transmission system to a scheduler management channel, and to vary contents of the other bit area in the scheduler management channel, as corresponding to the specific bit, and further transmit the scheduler management channel to the plurality of user terminals.

1 Claim, 22 Drawing Sheets

(56) References Cited

U.S. PATENT DOCUMENTS

| | | | |
|---|---|---|---|
| 7,751,369 | B2 | 7/2010 | Kishigami et al. |
| 7,869,416 | B2 | 1/2011 | Ramakrishna et al. |
| 7,907,911 | B2 * | 3/2011 | Alexiou et al. .................. 455/69 |
| 8,054,898 | B2 * | 11/2011 | Tong et al. .................... 375/260 |
| 2003/0161282 | A1 | 8/2003 | Medvedev et al. |
| 2004/0013180 | A1 | 1/2004 | Giannakis et al. |
| 2004/0248618 | A1 | 12/2004 | Yoshii et al. |
| 2005/0265470 | A1 | 12/2005 | Kishigami et al. |
| 2006/0234729 | A1 | 10/2006 | Murakami et al. |
| 2008/0051129 | A1 | 2/2008 | Abe et al. |

FOREIGN PATENT DOCUMENTS

| | | |
|---|---|---|
| EP | 1387501 | 2/2004 |
| JP | 2003-500976 | 1/2003 |
| JP | 2004-23716 | 1/2004 |
| JP | 2004-072566 | 3/2004 |
| JP | 2004-194262 | 7/2004 |
| JP | 2004-201296 | 7/2004 |
| JP | 2004-248206 | 9/2004 |
| JP | 2005-39807 | 2/2005 |
| JP | 2005-65242 | 3/2005 |
| JP | 2005-102136 | 4/2005 |
| KR | 2001-0076252 | 8/2001 |
| KR | 2003-0007481 | 1/2003 |
| WO | 01/76110 | 10/2001 |
| WO | 2005/122414 | 12/2005 |

OTHER PUBLICATIONS

Fujitsu; "Multi-beam MIMO for EUTRA Downlink"; Agenda Item: 8.5 (EUTRA MIMO); 3GPP TSG RAN WG1 meeting #43; R1-051438; Seoul, South Korea; Nov. 7-11, 2005.

Panasonic; "Feedback of UE measurement for MIMO"; Agenda Item: 10.3.1; 3GPP TSG RAN WG1 Meeting #44bis; R1-060795; Athens, Greece; Mar. 27-31, 2006.

Extended European search report with search opinion issued for corresponding European Patent Application No. 06713317.3 dated Jan. 20, 2012.

F.R. Farrokhi et al., "Spectral Efficiency of Wireless Systems with Multiple Transmit and Receive Antennas", dated 2000 IEEE, pp. 373-377.

International Search Report issued for corresponding International Patent Application No. PCT/JP2006/302174, dated May 16, 2006.

Korean Intellectual Property Office "Notice of Preliminary Rejection" for corresponding Korean Patent Application No. 10-2008-7019088, mailed Jun. 25, 2010. English translation attached.

Japanese Patent Office "Notification of Reason for Rejection" for corresponding Japanese Patent Application No. 2007-557709, dispatched on Aug. 31, 2010. English translation attached.

Japanese Patent Office "Notification of Reason for Rejection" issued for corresponding Japanese Patent Application No. 2007-557709, mailed Jan. 18, 2011. English translation attached.

Intellectual Property Office of China "First Notification of Office Action" issued for corresponding Chinese Patent Application No. 200680052545.0, mailed Apr. 15, 2011. English translation attached.

Intellectual Property Office of China "2nd Notification of Office Action" issued for corresponding Chinese Patent Application No. 200680052545.0, issued Nov. 30, 2011. English translation attached.

Extended European search report includes the supplementary European search report and the European search opinion issued corresponding to European Patent Application No. 06713317.3 dated Jan. 20, 2012.

3GPP TR 25.876 V2.0.0; 3rd Generation Partnership Project; Technical Specification Group Radio Access Network; Multiple-Input Multiple Output in UTRA; Technical Report dated Oct. 2005.

Panasonic; R1-060795; "Feedback of UE measurement for MIMO"; Agenda Item 10.3.1; 3GPP TSG RAN WG1 Meeting #44bis, Athens, Greece dated Mar. 27-31, 2006.

Fujitsu; R1-051438; Multi-beam MIMO for EUTRA Downlink; Agenda Item 8.5 (EUTRA MIMO); 3GPP TSG RAN WG1 Meeting #43, Seoul, South Korea dated Nov. 7-11, 2005.

"Non-Final Office Action" issued by the United States Patent & Trademark Office for corresponding U.S. Appl. No. 12/186,209, dated Aug. 18, 2011.

"Non-Final Office Action" issued by the United States Patent & Trademark Office for corresponding U.S. Appl. No. 12/186,209, dated Mar. 26, 2012.

Office Action issued for corresponding European Patent Application No. 06713317.3, dated Apr. 26, 2013.

* cited by examiner

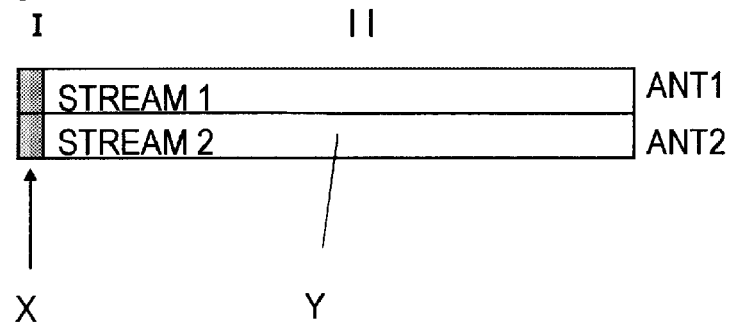
FIG.3
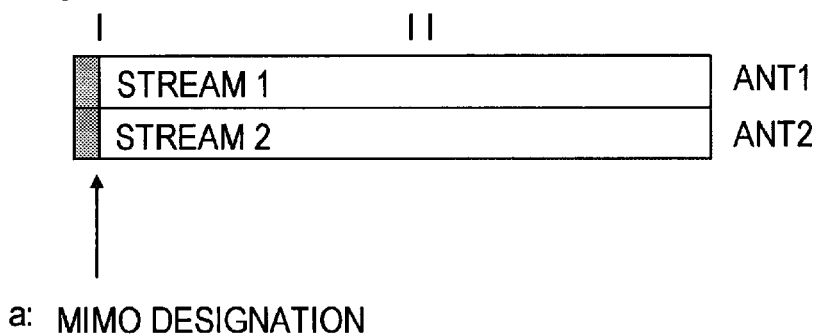
a: MIMO DESIGNATION
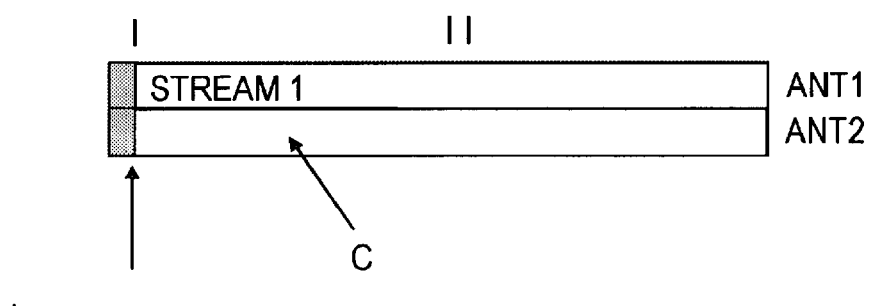
b: BEAMFORMING DESIGNATION

RADIO COMMUNICATION SYSTEM USING MULTI-ANTENNA TRANSMISSION TECHNIQUE, AND MULTI-USER SCHEDULER THEREFOR

CROSS REFERENCE TO RELATED APPLICATIONS

The present application is a Divisional of U.S. application Ser. No. 12/186,209, filed on Aug. 5, 2008, now U.S. Pat. No. 8,345,641, which is a continuation of International Application No. PCT/JP2006/302174, filed on Feb. 8, 2006, the contents of each are herein incorporated by reference.

FIELD OF THE INVENTION

The present invention relates to a radio communication system using a multi-antenna transmission technique, and a multi-user scheduler to be applied thereto.

BACKGROUND ARTS

In the radio communication, as a technique of using a plurality of transmission and reception antennas (multi-antenna), there have been studied a technique of transmission by a multiplicity of antennas and reception by a multiplicity of antennas (MIMO: Multi Input Multi Output) in which different streams are transmitted from each antenna, thereby improving throughput, and a beamforming (which may be represented as BF hereinafter in an appropriate time) technique in which multiplex transmission is performed by weighting an identical stream, thereby improving reception quality (Non-patent document 1).

Further, in Patent document 1, in a mobile communication system having a plurality of antennas, in order to improve spatial efficiency, there has been disclosed a method of adaptively performing switching control in a mixed environment of space multiplexing (SDM: Space Division Multiplex, SDMA: Space Division Multiplex Access), according to a traffic condition in a communication area.

However, conventionally, the MIMO multiplexing and beamforming have been recognized as independent techniques because of the passage of different propagation paths, and a study taking mutual fusion into consideration has hardly been made.

Namely, in the beamforming mode, because transmission weighting is made, a passing propagation path is different from that in the MIMO multiplexing, and accordingly, it is difficult to simultaneously control both methods using a single common pilot. Therefore, the necessity of separate pilots has been studied. As a result, in any of the above-mentioned documents, there is neither disclosure nor suggestion about a concrete structure of controlling switching between the MIMO (SDM is also included in MIMO) and the beamforming.

[Non-patent document 1] "Spectral Efficiency of Wireless Systems with Multiple Transmit and Receive Antennas", F. R. Farrokhi et al., PIMRC2000 vol. 1 page 373-377.

[Patent document 1] the official gazette of the Japanese Unexamined Patent Publication No. 2004-201296.

DISCLOSURE OF THE INVENTION

Problems to be Solved by the Invention

From the above viewpoint, the present invention has been invented from the viewpoint of adaptively choosing the use of MIMO multiplexing and beamforming techniques. It is an object of the present invention to provide a concrete method for effectively fusing a scheduler management channel used in adaptive modulation with a multi-antenna transmission technique, and a radio communication system using the above method.

Further, it is another object of the present invention to provide a radio communication system capable of switching MIMO among multiplexing, beamforming and transmission diversity to save energy when information amount to be transmitted is small, to obtain stable communication when communication condition is severe due to the vicinity of a cell edge in mobile communication, and to optimize communication when correlation exists in the propagation paths.

Means to be Solve the Problems

As a first aspect of the present invention to achieve the aforementioned objects, a transmitting station in a radio system performing scheduled transmission to a plurality of users from the transmitting station having a plurality of antennas is disclosed. The above transmitting station obtains reception quality information estimated from a pilot channel among information fed back from the plurality of users, and based on the obtained reception quality information, determines a transmissions system whether to perform MIMO multiplexing, which transmits data of different streams from the respective plurality of antennas, or to perform beamforming, which transmits an identical stream data by weighting each of the plurality of antennas, and further, transmits the information identifying the determined transmission system to the user side by adding to a scheduler management channel.

In the above first aspect, the information to identify the determined transmission system to be added to the scheduler management channel is constituted of a specific bit, and corresponding to the specific bit, a format of the other bit area in the scheduler management channel is varied.

Further, when the determined transmission system is beamforming, corresponding to the specified bit added to the scheduler management channel, weight information to the plurality of antennas or weight information of a plurality of reception antennas is reported using the other bit area.

As a second aspect of the present invention to achieve the aforementioned objects, a transmitting station in a radio system includes: a plurality of antennas; a memory storing information of a plurality of users; a first modulation section adaptively modulating the user information output from the memory; a time-division conversion section performing time-division multiplexing of the user information output from the memory, and a second modulation section adaptively modulating the each time-divided output; corresponding to the plurality of antennas, a plurality of radio signal generation sections supplying outputs of the first modulation section and the second modulation section to the plurality of antennas; a reception section obtaining reception quality information estimated from a pilot channel among information fed back from the plurality of users; and based on the reception quality information obtained in the reception section, a scheduler determining a transmission system whether to perform beamforming, which transmits an identical stream data by weighting each of the plurality of antennas or to perform MIMO multiplexing, which transmits data of different streams from the respective plurality of antennas. Further, the above scheduler controls to validate the output of the first modulation section when performing the beamforming transmission, and to validate the output of the second modulation section when performing the MIMO multiplexing transmission.

Further, as a third aspect of the present invention to achieve the aforementioned objects, in a radio system performing scheduled transmission to a plurality of receiving stations from a transmitting station having a plurality of antennas, a transmitting station obtains reception quality information estimated from feedback information obtained from the plurality of receiving stations, and determines a transmission system whether to perform beamforming transmission, which transmits data of an identical stream by weighting each of the plurality of antennas based on the obtained reception quality information, or to perform MIMO multiplexing transmission, which transmits data of different streams from the respective plurality of antennas, and transmits information to identify the determined transmission system by adding to a scheduler management channel. Further, from the above identification information in the scheduler management channel, each of the plurality of receiving stations decides a decoding algorithm depending on either a beamformed transmission signal or a MIMO multiplexed transmission signal. Further, according to the decided decoding algorithm, in case of the MIMO multiplexed transmission signal, each receiving station demodulates by obtaining the modulation system from the information in the scheduler management channel, using a channel estimation value estimated from the pilot channel, while in case of the beamformed transmission signal, based on the weight information added to the scheduler management channel, each receiving station performs signal synthesis between the plurality of antennas and channel compensation by performing optimal reception weighting.

In the second aspect, it is possible to configure such that an uplink and a downlink channel between the transmitting station and the receiving station are divided with different carrier wave frequencies, and further, the receiving station transmits to the transmitting station a channel matrix estimated from the received pilot signal and a signal to integrated noise ratio on the basis of each of the plurality of antennas, as the feedback information.

Further, the above transmitting station may obtain a zero forcing (ZF) solution from the channel matrix fed back from the receiving station, calculate the ZF solution, and reflect only either an obtained transmission weight Wtx or a reception weight Wrx in the scheduler management channel.

Still further, when the transmission weight Wtx obtained from the scheduler management channel is transmitted, it is also possible to configure such that the receiving station obtains a reception weight Wrx of a Minimum Mean Square Error (MMSE) solution, using the channel estimation value obtained from the received pilot, and using the obtained reception weight Wrx, the receiving station performs signal synthesis in regard to the plurality of antennas.

Further, in the second aspect, the receiving station calculates a zero forcing (ZF) solution from a channel matrix estimated from the received pilot signal, and transmits the obtained transmission weight Wtx and channel quality information of beamforming to the transmitting station, as the feedback information.

Also, in the second aspect, the receiving station transmits to the transmitting station a transmission weight Wtx obtained by calculating a zero forcing (ZF) solution from a channel matrix estimated from the received pilot signal or transmission direction information obtained from the peak of a beam pattern in a power concentration direction generated from the obtained transmission weight Wtx, as the feedback information.

Further, the transmitting station generates the beam pattern so that power is concentrated in a transmission direction fed back from the receiving station, and reflects the transmission weight Wtx corresponding to the beam pattern in the scheduler management channel.

Still further, in the second aspect, an uplink and a downlink channel between the transmitting station and the receiving station are time-divided with an identical carrier wave frequency, and the transmitting station obtains a channel matrix by correcting a power difference between the transmitting station and the receiving station in regard to a channel estimation value from the receiving station to the transmitting station, and calculates a ZF solution from the obtained channel matrix, so as to generate a reception weight Wrx or a transmission weight Wtx.

Further, it is possible to configure the receiving station to obtain a reception weight Wrx of a Minimum Mean Square Error (MMSE) solution, using the transmission weight Wtx obtained from the scheduler management channel and the channel estimation value obtained from the received pilot channel, and to perform signal synthesis in regard to the plurality of antennas using the obtained reception weight Wrx.

BRIEF DESCRIPTION OF THE DRAWINGS

FIG. 3 shows a diagram illustrating an exemplary configuration of a scheduler management channel B according to the present invention.

FIG. 4 shows a diagram illustrating a case that a decision bit X in an area I of a scheduler management channel B specifies MIMO multiplexing (a).

FIG. 5 shows a diagram illustrating a case that a decision bit X in an area I of a scheduler management channel B specifies beamforming (b).

PREFERRED EMBODIMENTS MODE FOR CARRYING OUT THE INVENTION

The preferred embodiment of the present invention is described hereinafter referring to the charts and drawings. However, it is noted that the embodiments aim at better understanding of the present invention, and accordingly, the technical scope of the present invention is not limited to the embodiments described below.

Now, for the sake of understanding of the present invention, fundamental features of the present invention will be described first. Additionally, for simplifying the description and easy understanding, a packet-based mobile communication system is considered here as a radio communication system, and as a simplest channel structure, only pilot channel, scheduler management channel and data channel are dealt with as an example.

Figure 1:
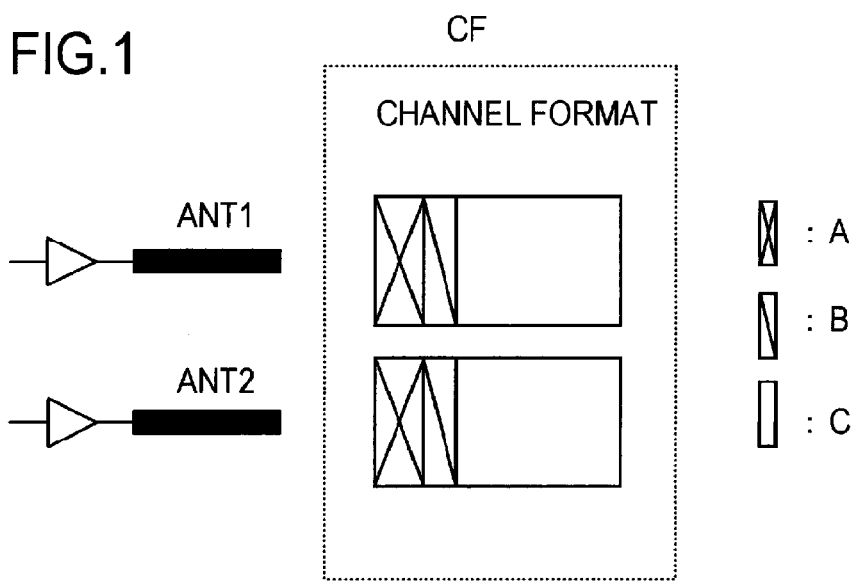
FIG. 1 shows a diagram illustrating a simplest example of multi-antenna transmission.

Further, in the description hereafter, as a simplest example of multi-antenna transmission, the description is made taking an example of transmission using two antennas ANT1, ANT2, as shown in FIG. 1. However, it is possible to perform similar control in case of transmission using a plurality M of antennas more than and inclusive of two (M≥2).

In FIG. 1, a notation A in a transmission channel format CF forwarded from the antennas ANT1, ANT2 represents the pilot channel, and a notation B represents the scheduler management channel, and a notation C represents the data channel.

Figure 2:
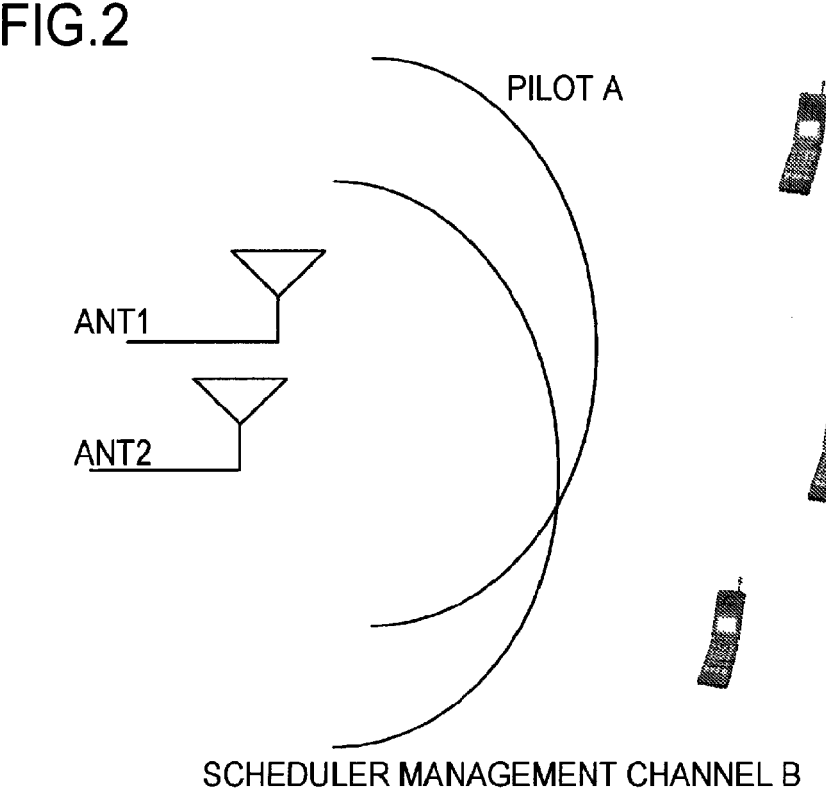
FIG. 2 shows a diagram explaining transmission (omni transmission) of a pilot channel A and scheduler management channel B to the overall cells.

Here, as shown in FIG. 2, it is necessary to transmit the pilot channel A and the scheduler management channel B to an overall cell (omni transmission). Further, as to the pilot channel A, to avoid interference between transmission antennas 1, 2, transmission is performed after orthogonalizing each code or time-frequency. Similarly, as to the scheduler management channel B of which transmission is also required to the overall cell, either orthogonalized transmission is performed or reception is performed by use of a technique such as most likelihood detection (MLD).

Further, in regard to the above two transmission channels (pilot channel A and scheduler management channel B), it is necessary to receive error-free even at a cell edge.

In contrast, according to the present invention, it is decided whether the MIMO multiplexing transmission or the beamforming is to be made, from reception quality information (CQI: Channel Quality Indicator) estimated from the pilot channel A, with attention directed to the data channel C which is transmitted to only a scheduled user.

According to the control in the present invention, MIMO multiplexing is performed when correlation between transmission antennas is low in an area near the self-cell with a good SINR (Signal to Interference and Noise Ratio), so as to improve a throughput. Oppositely, beamforming is applied in an area either having a poor SINR near a cell edge or having high correlation between transmission antennas, so as to increase a signal gain. Thus, as a feature, the throughput (communication amount) and coverage (communicable range) are improved.

Additionally, it may also be considered to decide whether to perform coded transmission diversity or beamforming by measuring space correlation of the transmission antennas.

In the following embodiments, only an exemplary case of switching between MIMO multiplexing and beamforming is dealt with.

FIG. 3 shows a diagram illustrating an exemplary configuration of a scheduler management channel B according to the present invention. As a feature, in a partial area I of the scheduler management channel B, there is inserted a decision bit X to specify whether to perform MIMO multiplexing or beamforming. Here, the decision bit X is not necessarily placed at such the top area of the channel as shown in FIG. 3. Referring to FIGS. 4, 5, the following describes that contents Y signified by bits in other areas are changed as a result of the decision of the above decision bit X.

FIG. 4 shows a diagram illustrating a case that a decision bit X in an area I of the scheduler management channel B specifies MIMO multiplexing (a). In case of the MIMO multiplexing, there are two data streams to be transmitted by the antenna ANT1 and the antenna ANT2, and a control information amount is included in an area II to specify adaptive modulation according to the two streams.

FIG. 5 shows a diagram illustrating a case that a decision bit X in the scheduler management channel B specifies beamforming (b). As contrasted with the MIMO multiplexing, in case of the beamforming, data to be transmitted is one stream, and a less control information amount of specifying adaptive modulation is needed. As such, the decision bit X of MIMO multiplexing or beamforming is defined, and according to the decision thereof, the signification of other bits is changed.

Also, in the area having a reduced control image amount in case of the beamforming, there is provided a designation (c) for appropriately reporting either a transmission weight of the beamforming or alternatively, a transmission weight and a reception weight for a receiver.

As such, according to the present invention, based on the decision result of the decision bit X added to the partial area I in the scheduler management channel B, it is possible to switch over between the MIMO multiplexing and the beamforming instantaneously.

Figure 6:
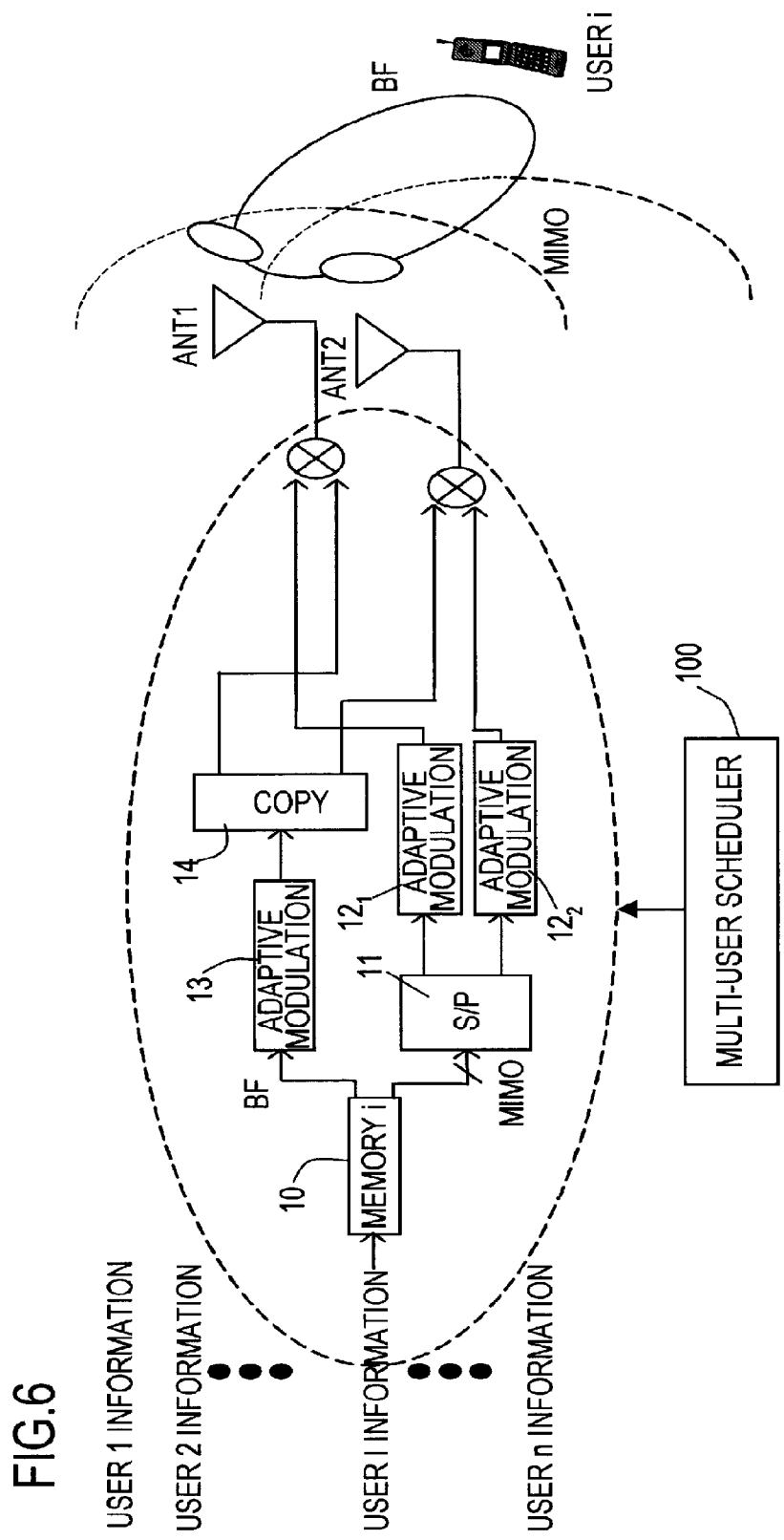
FIG. 6 shows a diagram illustrating a schematic configuration of a transmitting station to which the present invention is applied.

FIG. 6 shows a diagram illustrating a schematic configuration of a transmitting station to which the present invention is applied.

The configuration shown in FIG. 6 is applicable to a transmitting station having multi-antennas (two antennas ANT1, ANT2, as an example) when transmitting by scheduling a plurality of users. As one example of the system, the transmitting station corresponds to a base station in a mobile telephone system, and a downlink for transmission therefrom to the plurality of users (mobile terminals) is assumed.

As to the plurality of users, user 1 to user n, being in communication with a certain transmitting station, necessary information is collected from the Internet, etc. The collected user 1 information to user n information is temporarily cached into a position corresponding to the user i in a memory 10 of the transmitting station.

According to a transmission request from a scheduler 100, data transmission is prepared. In FIG. 6, there is depicted a schematic diagram illustrating that, at certain timing in a certain band, a transmission request to the user i is made and either MIMO multiplexing or beamforming is selected. The above selection is determined in reflection of a pre-trained propagation path condition.

Now, in case the MIMO multiplexing is selected, data for two streams are read out from memory 10, and by means of a serial-to-parallel (S/P) converter 11, the data are split into each information amount to be transmitted from each antenna (ANT) 1, 2. Then, on the basis of each split information amount, coding and modulation (adaptive modulation) corresponding to each propagation environment from the antennas ANT1, ANT2 are performed in adaptive modulators $12_1$, $12_2$.

Because the adaptively modulated signals are mutually different signals, the signals are converted into radio frequencies and radiated from the antennas ANT1, ANT2 without being weighted. The chart depicted with dotted lines from the antennas ANT1, ANT2 is MIMO multiplexing radiation patterns.

On the other hand, in case the beamforming is selected, a data for one stream is read out from memory 10, and a signal being adaptively modulated in an adaptive modulator 13 is copied in a copying section 14, which is thereafter weighted so that a directivity gain is directed to the user, and then radiated from the antennas ANT1, ANT2. Each weight is obtained from pre-trained transmission path information. The solid line depicted toward the user i from the antennas ANT1, ANT2 is a beamforming radiation pattern.

Thus, scheduler 100 is configured to specify a variety of modes on the basis of the trained propagation path information.

Next, the merits of reporting the weight in transmission/reception beamforming proposed in the present invention are described.

In the conventional example, when performing transmission beamforming, in addition to a common pilot to be transmitted to the overall cell, it is generally performed to insert a separate pilot for a certain user. Using FIG. 7, the conventional example using a separate channel is described.

Figure 7:
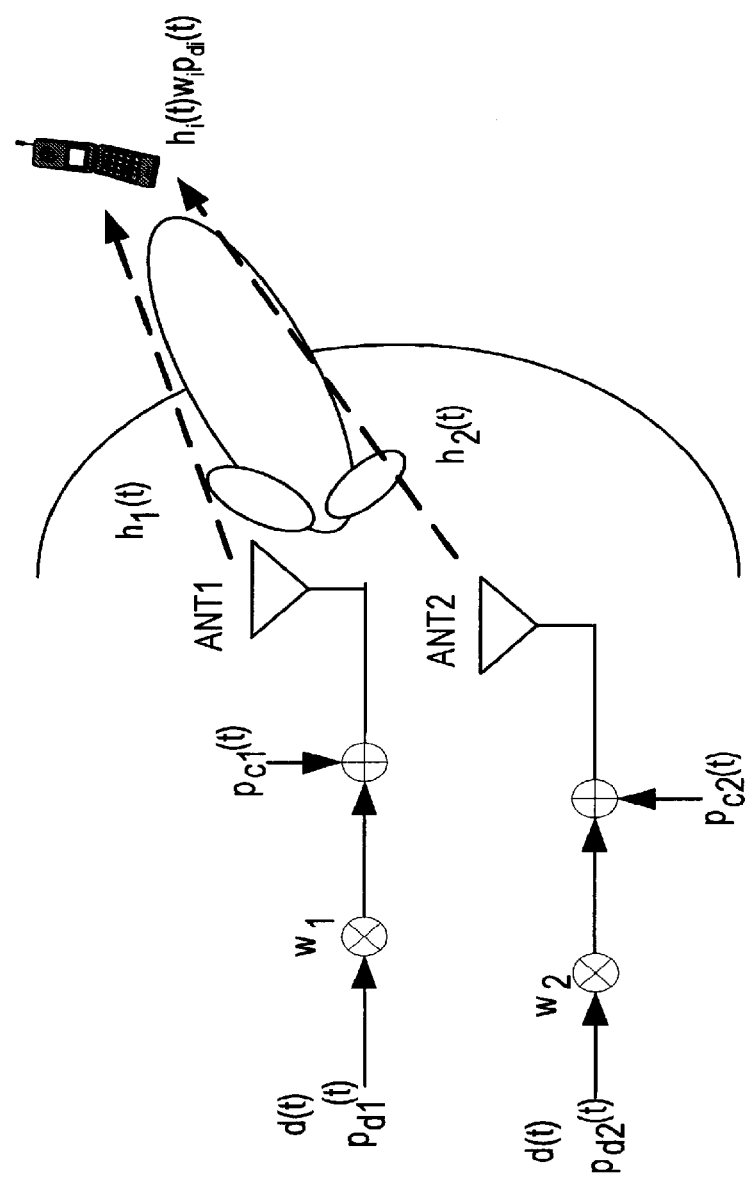
FIG. 7 shows a diagram illustrating the conventional example using a separate channel.

In FIG. 7, d(t) is a data for a certain user, $w_1$, $w_2$ are weights for beamforming to the certain user, $p_{c1}(t)$, $p_{c2}(t)$ are orthogonal common pilots to be inserted antenna-by-antenna, and $h_1(t)$, $h_2(t)$ are propagation paths from the antennas ANT1, ANT2 to the certain user. Further, each separate pilot is represented as $p_{d1}(t)$, $p_{d2}(t)$.

Additionally, to simplify the notations, in regard to the above FIG. 7, a case of a single reception antenna is depicted, and however, no particular problem arises if the number of antennas is increased. Also, as to the weight W, no notation of time t is shown. The reason is that if there is a high spatial correlation, tracking the weight W comes to greatly depend on the angular velocity of a user position, and the transmission direction is not varied in an instantaneous time variation in fading. Reversely speaking, if the spatial correlation is low, dependency on time t occurs.

In order to make each separate pilot pass through the same propagation path of the independent user data, the insertion thereof into the same resource of the data is required. Also, in order to perform propagation path estimation including the fading by means of the above separate pilot, a notation of time t is given.

When looking at the source of channel estimation, at a moment when there is no separate pilot, it is not possible to decode data because a fading variation is not known.

Figure 8:
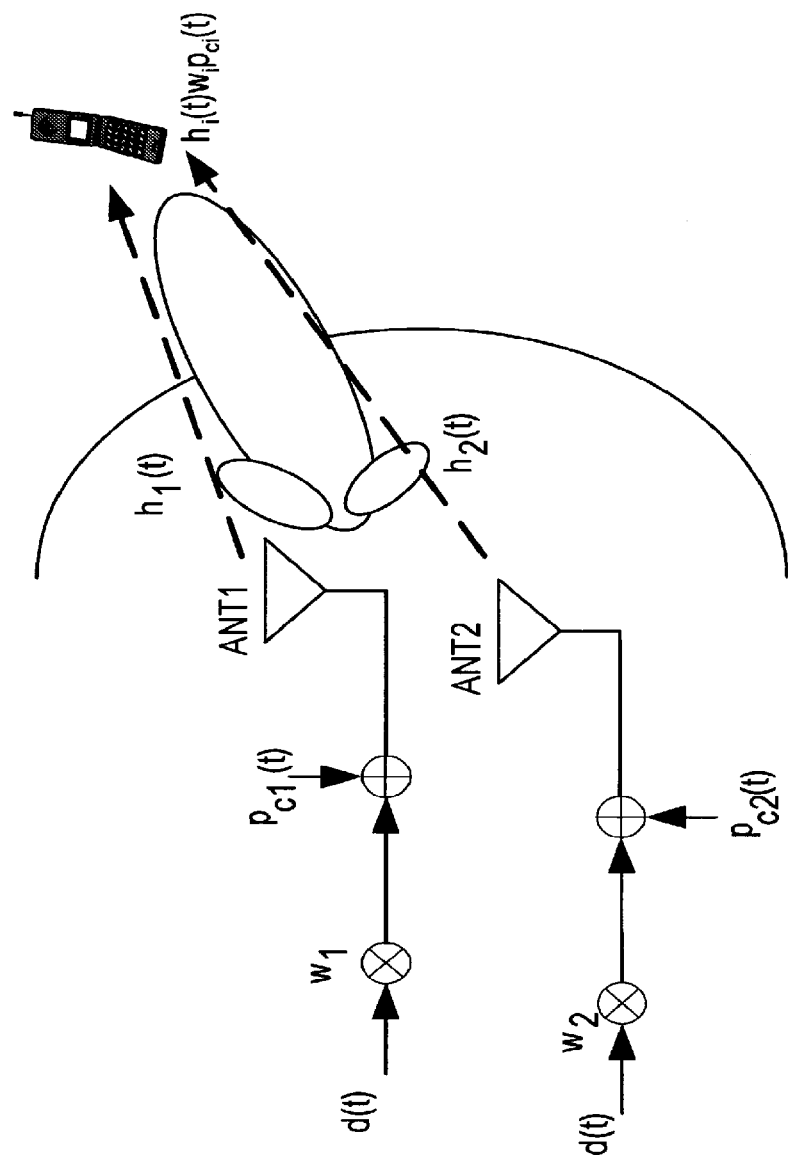
FIG. 8 shows a diagram explaining a method of reporting a transmission weight w when performing transmission beamforming.

Next, using FIG. 8, there is described a method of reporting a transmission weight w when performing transmission beamforming.

The configuration is the same as illustrated in FIG. 7, and however, according to the present method, by reporting transmission weights $w_1$, $w_2$ to a receiver, a propagation path on which data have been passed through is estimated in combination with the common pilot.

The basic principle is that channel information through space propagation from the respective antennas ANT1, ANT2 can be estimated using the common pilot, and that if the weight information of each antenna is known further, the propagation path on which data have passed can be estimated.

Further, if the spatial correlation between the transmission antennas ANT1, ANT2 is high, the fading variation between the transmission antennas is looked similar, and therefore, optimization of the weight becomes an issue which can be solved by tracking using the angular velocity of the receiver looked from the transmission antenna. Therefore, differently from the separate pilot, the data can be decoded even when the weight information is decimated to a certain extent.

Alternatively, it is also possible to improve information accuracy of the transmission weight by decimating transmission opportunities and adding redundancy. Further, because the channel response tracking the fading can be obtained by the common pilot having large transmit power, it is possible to perform channel estimation with high accuracy.

Thus, the merits of the beamforming of a weight report type are great and flexible because it is possible to report the weight according to the adaptive modulation.

Next, in regard to pre-trained channel information and information necessary to feedback, description of FDD (Frequency Division Duplex) and TDD (Time Division Duplex) are made separately.

First, the description is started from the FDD. Because a transmission link for propagating from a transmitting station to a receiving station has a different carrier wave frequency from a reception link for propagating from the receiving station to transmitting station equipment, it is useless for the transmission link if a channel estimation value of the reception link is trained. In regard to four combinations of information to be fed back at this time, description is made using Table 1.

TABLE 1

| | Combination of feedback information (FDD) | | |
|---|---|---|---|
| Group | Feedback from the receiving station | Information from the transmitting station | Wrx for the receiving station |
| 1 | Channel matrix H | Obtain an optimal weight, and report $W_{rx}$ | Apply the reported information |

TABLE 1-continued

Combination of feedback information (FDD)

| Group | Feedback from the receiving station | Information from the transmitting station | Wrx for the receiving station |
|---|---|---|---|
| 2 | | Obtain an optimal weight, and report $W_{tx}$ | Calculate by the MMSE criterion |
| 3 | Optimal weight $W_{tx}$ CQI at the time of BF | Inform of $W_{tx}$ (*1) | Recalculate by the MMSE criterion (*2) |
| 4 | Quantized information of the optimal weight $W_{tx}$ CQI at the time of BF | Inform of $W_{tx}$ | Calculate by the MMSE criterion |

MMSE (Minimum Mean Square Error)
CQI (Channel Quality Indicator: represented by quantizing the propagation path quality using a particular rule)

In the above Table 1, the combination groups 1, 2, are a method such that a channel matrix H estimated from the common pilot received from the transmitting station is calculated in the receiving station side, and the above calculation result is fed back to the transmitting station side.

From the transmitting station receiving the channel matrix H, in the group 1, a reception weight obtained by expressions (7), (8), which are shown in the background theory explained later, is reported using the area of the scheduler management channel B, and the receiving station demodulates the information carried by being beamformed from the above reported information.

The group 2 is a method such that the transmission weight obtained from expressions (7), (8) is reported, and however, by considering a propagation path variation due to a delay before the beamformed information is actually carried and the noise condition in a receiver, a reception weight of an optimal MMSE minimization criterion is calculated from the transmission weight and the channel estimation value of the common pilot at that moment, so as to demodulate. With this, time trackability and noise tolerance can be improved.

In the group 3, when the entire information of the channel matrix H is feedback transmitted from the receiving station, a link capacity from the receiving station to the transmitting station is greatly consumed. Therefore, considering such inconvenience, the receiver side calculates an optimal transmission weight obtained from expressions (7), (8), to feed back the above value $W_{tx}$. By modifying the feedback amount from a matrix type into a vector type, the reduction of the link capacity from the receiving station to the transmitting station can be suppressed.

From the transmitting station, the reported transmission weight is reported through the scheduler management channel B, and in regard to the information, beamforming transmission thereof is performed after the weight is added.

Additionally, in the above Table 1, as an item shown as (*1), if the weight reported from the receiving station is applied at all times, and if the optimal transmission weight fed back is continued to be stored in the receiving station, reception can be made without the weight information through the scheduler management channel B.

Also, by the reception weight calculation in the receiving station, as described in regard to the group 2, the reception weight of the MMSE minimization criterion is obtained with the consideration of the time trackability and noise tolerance, and by the use thereof, decoding can be performed.

Additionally, in Table 1, as an item shown as (*2), if the reception weight at the time of calculating the optimal transmission weight first is continued to be stored and if a characteristic deterioration is allowed to some extent, reception can be made without obtaining the reception weight of the MMSE criterion again. By this, the calculation amount can be reduced.

The group 4 is intended to further reduce the feedback amount on the link from the receiving station to the transmitting station performed in the group 3. To the transmission weight $W_{tx}$ obtained from expressions (7), (8) in the receiving station side, the method is to convey a gain peak direction of a beam pattern generated using the weight concerned. By reporting only an important point at which transmission beamforming energy is concentrated, it is possible to drastically reduce the feedback by aggregating information of only one transmission direction, as contrasted to the group 3 transmitting weight information for the number of transmission antennas.

Namely, by modifying the feedback amount from a vector type to a scalar type, it becomes possible to suppress reduction of link transmission capacity from the receiving station to the transmitting station. Additionally, if the correlation between the transmission antennas is high, the method of interest becomes greatly effective because quality deterioration is not so largely produced even the weight information for the number of transmission antennas is aggregated into one transmission direction.

Further, as a means for further information compression, in the method of the group 4, when an optimal transmission direction is obtained as, for example, 43°, by setting a rule in advance such that the quantization step in the transmission direction is defined at the intervals of 8°, the approximation value of 40° is obtained.

Figure 9:
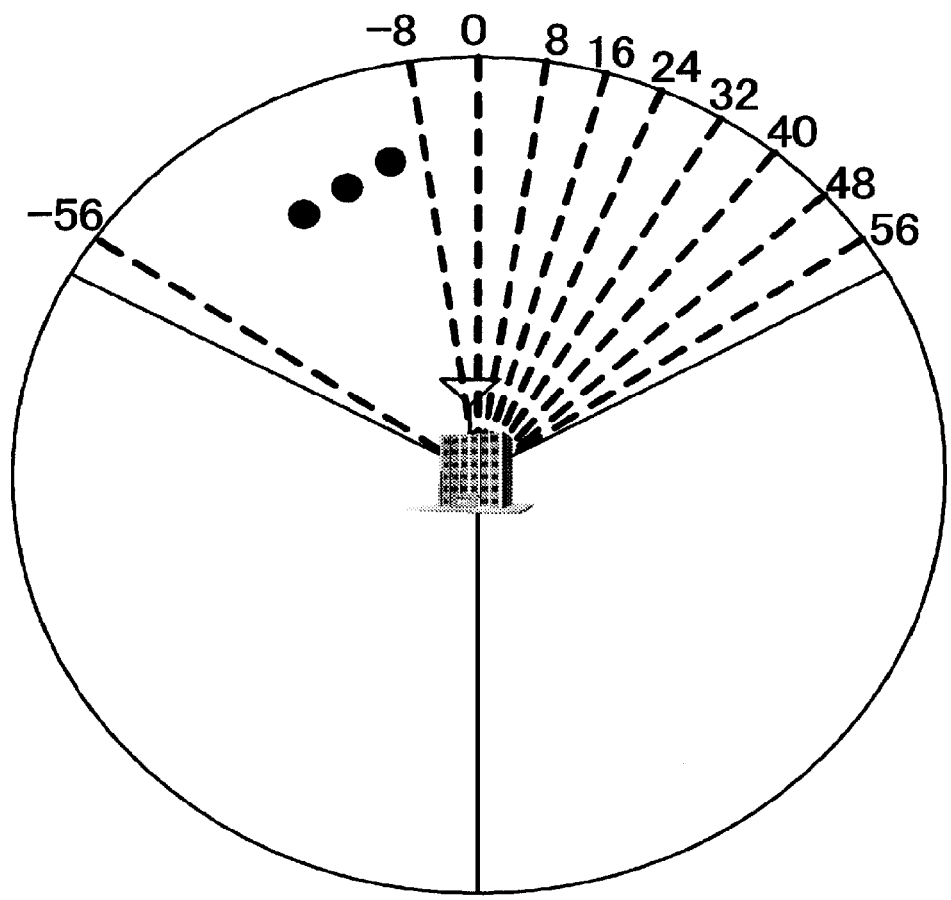
FIG. 9 shows a diagram illustrating an example of an antenna radiation angle.

For example, as shown in FIG. 9, illustrating an example of an antenna radiation angle, if the antenna is configured of three sectors of 120° each, the transmission direction is 15 states, and the entire transmission weights of the transmission antenna can be determined by use of only 4 bits. As such, it is also possible to consider transmission by quantizing the scalar value of the information amount to be fed back.

In the transmitting station, the weight is generated based on the reported transmission direction. From the transmitting station, an actually applied weight is reported using the scheduler management channel B. The receiving station then calculates a reception weight of the optimal MMSE criterion using the above information and the channel estimation value of the common pilot at that moment, so as to demodulate.

Thus, in case of the FDD, it is possible to perform beamforming control using any one suitable method from among the four groups of feedback methods listed in Table 1.

Next, description is made on the case of TDD. An identical frequency band is used for both a transmission link and a reception link. Since it is possible to make use of a channel estimation value of the reception link through training in the receiving station for the transmission link in the transmitting station, information to be fed back from the receiving station to the transmitting station can greatly be reduced. Further description is made using Table 2.

TABLE 2

Combination of feedback information (TDD)

| Group | Calculation in the transmission station | Report from the transmission Station | Receiving station Wrx |
|---|---|---|---|
| 5 | Channel matrix H | Obtain an optimal weight and report $W_{rx}$ | Apply the reported information |
| 6 | | Obtain optimal weight and report $W_{tx}$ | Calculate using MMSE criterion |

Additionally, to apply the channel matrix from the receiving station to the transmitting station to the direction from the transmitting station to the receiving station, the difference between the transmission power in the transmitting station and the transmission power in the receiving station is corrected, so as to be regarded as substantially equivalent.

In both the groups 5, 6, a channel matrix H from the transmitting station to the receiving station is estimated using the channel matrix estimated from the pilot channel, transmitted from the receiving station to the transmitting station, and the correction information, such as the transmission power difference between the transmitting station and the receiving station.

From the channel matrix thus obtained, an optimal transmission weight and a reception weight are calculated by solving the expressions (7), (8) described later. Here, in the group 5, the above optimal reception weight is reported, and in the receiving station, beamformed information is demodulated using the above information.

In the group 6, the transmission weight obtained from expressions (7), (8) are reported, while the reception weight is not reported. To calculate the reception weight in consideration of the actual propagation channel condition from the transmitting station to the receiving station and a receiver noise, the optimal reception weight of the MMSE criterion is calculated using the channel estimation value of the common pilot at that moment and the transmission weight, so as to demodulate. Thus, it is possible to further improve noise tolerance, etc. as compared to the group 5.

Now, to understand the above description, a background theory will be described.

Assuming a certain user reception condition, a signal reception condition at a certain moment is expressed by expression (1). A vector x represents a transmission signal.

[1]

$$y(t)=Hx(t)+n(t) \qquad (1)$$

Each element of H produces a mutually independent multipath. Here, if it can be regarded that the propagation path condition is invariable within the time in which orthogonal pilots spread across a plurality of symbols are used, expression (2) is led.

[2]

$$Y(t)=HP(t)+N(t) \qquad (2)$$

Here, each element of P(t) signifies a transmission antenna number in the row direction, and transmission timing of the column direction. Further, P(t) has the following property because of being an orthogonal pilot. Here, normalization is performed so as to form a unit matrix after the calculation of self-correlation.

[3]

$$P(t)P(t)^H=P(t)^H=P(t)=I \ldots P(t)^H=P(t)^{-1} \qquad (3)$$

Utilizing the above property, a channel estimation value is obtained. By performing the processing as shown by expression (4) in a section having correlation in the propagation path, the second term signifying noise is suppressed.

[4]

$$\hat{H}=Y(t)P(t)^H=HP(t)P(t)^H+N(t)P(t)^H=H+N(t)P(t)^H \qquad (4)$$

Next, let the transmission signal to be d(t), then the reception condition when beamformed with the transmission weight W, and the reception weight W, is represented as shown by expression (5).

[5]

$$r(t)=w^H_{rx}Hw_{tx}d(t)+w^H_{rx}n(t) \qquad (5)$$

Here, the known information on the reception side is the reception weight $W_{rx}$ obtained by the MMSE criterion, etc. and the channel estimation value;

[6]

$$\hat{H}(\approx H)$$

As to the unknown transmission weight $W_{tx}$, it is necessary to be instructed from the transmitting station. Feeding back the above transmission weight $W_{tx}$ by the scheduler management channel B is one of the features of the present invention.

Next, a generation method of the transmission weight $W_{tx}$ is described. The above channel estimation value capable of estimated in a terminal is used. In the terminal, since noise influence to be generated in future is not predictable, the transmission signal weight $W_{tx}$ is to be generated by ZF (Zero Forcing; for use in the equalization of a self-signal, etc.), and the expected reception at that time is as shown by expression (6).

[7]

$$\hat{r}(t)=w^H_{rx}\hat{H}w_{tx}d(t) \qquad (6)$$

To maximize the reception power in the receiving station, it is sufficient if the algorithm shown in expression (7) is solved.

[8]

$$\arg\max_{w_{tx},w_{rx}} \left[ w^H_{rx}\hat{H}w_{tx}\left(w^H_{rx}\hat{H}w_{tx}\right)^* \right] \qquad (7)$$

\* is complex conjugate

Here, as a restraint condition of a constant transmission power and a restraint condition of a reception weight, attention is to be paid on expression (8).

[9]

$$\sum_{i=1}^{z} w_{tx}w^H_{tx} = const$$

$$\sum_{i=1}^{z} w_{rx}w^H_{rx} = const \qquad (8)$$

$$const = 1$$

Additionally, an ideal solution of the algorithm shown in expression (7) is a value in which the transmission and reception weighting is made so that the signal is directed to either an orthogonal space having a maximum proper value of the self-correlation matrix obtained from the channel matrix or an orthogonal space having a largest singular value obtained from SVD of the channel matrix.

Also, as to the MMSE solution of the beamforming, based on

[10]

$\hat{H}$ estimated as a pre-reported transmission weight $W_{tx}$, a solution $W_{rx}$ given by the following expression (9) is to be obtained.

[11]

$$\underset{w_{rx}}{\operatorname{argmin}}\left[|1 - w_{rx}^H H w_{tx}|^2\right] \quad (9)$$

$$\text{wherein, } \sum_{i=1}^{z} w_{rx} w_{rx}^H = const$$

$$const = 1$$

Next, concrete embodiments in the cases of FDD and TDD listed in above Table 1 and Table 2 will be described.

Embodiment 1

Figure 10:
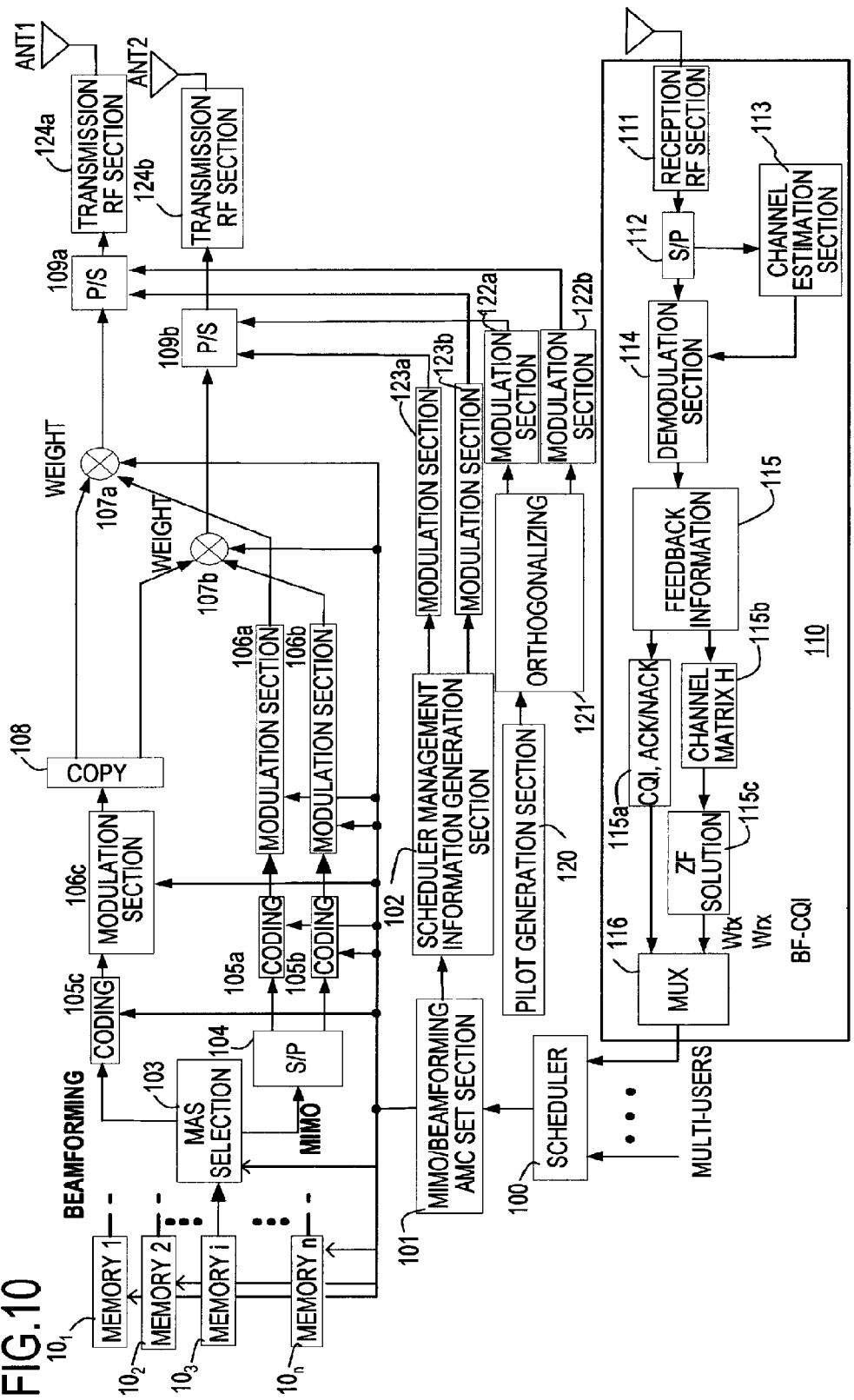
FIG. 10 shows a diagram explaining a transmitting station in an exemplary implementation listed as a group 1 of Table 1, as an embodiment 1.
Figure 11:
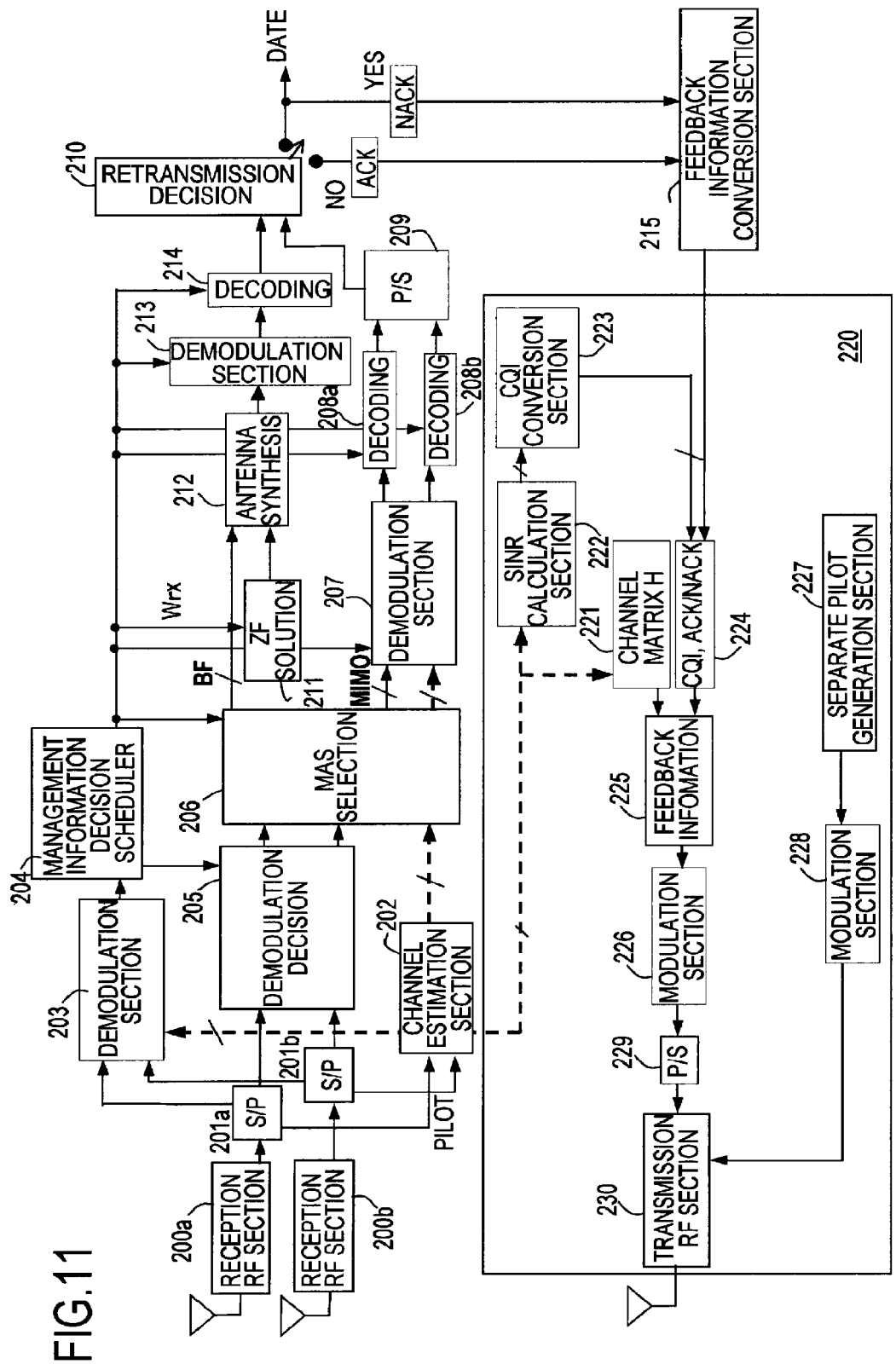
FIG. 11 shows a diagram explaining a receiving station in an exemplary implementation listed as a group 1 of Table 1, as an embodiment 1.

As an embodiment 1, the description is made in regard to a transmitting station in the implementation example listed as a group 1 of Table 1 as shown in FIG. 10, and in regard to a receiving station as shown in FIG. 11.

[Transmitting Station]

In a transmitting station communicating with a plurality (n) of users, the data of the above plurality (n) of users are stored in advance in (n) memories $10_1$-$10_n$.

There is a mechanism of reading out data from memories $10_1$-$10_n$ according to a request from a scheduler 100. Here, from the receiving station (refer to FIG. 11) of each user, feedback information is returned so as to report space propagation path information and the validity/invalidity of the transmitted data.

Scheduler 100 is operated by totaling the above information for the entire users. In FIG. 10, only a feedback information reception section 110 for one user is shown.

For example, an example of time multiplexing of each channel is shown in FIG. 10 and thereafter. Additionally, multiplexing of each channel is not limited to the time multiplexing if only orthogonal multiplexing is made.

The signal transmitted from the receiving station is down-converted into a baseband in a reception radio frequency (RF) section 111. Next, by means of an S/P (serial-to-parallel) conversion section 112, each time-multiplexed channel is extracted, and then a propagation path variation is obtained in a channel estimation section 113, using a pilot channel separate for each user. Compensation for the obtained propagation path variation is performed in a demodulation section 114.

Additionally, when error correction processing is made, a decoding section is required following demodulation section 114. Next, from among the data demodulated in demodulation section 114, feedback information is extracted in a feedback information section 115, from which CQI and ACK (acknowledge)/NACK (not acknowledge) information 115a, which is required for adaptive modulation system already performed, and channel matrix information 115b transmitted from the transmitting station to the receiving station are obtained.

A channel matrix H in the above channel matrix information 115b is information necessary for performing transmission beamforming. Further, from the channel matrix H, an optimal ZF solution 115c obtained from the above expressions (7), (8) is obtained.

In the group 1, transmission/reception weight vector information Wrx and CQI at bit forming (BF-CQI) obtainable from expression (13) shown below are selected, and carried to scheduler 100 after being multiplexed together with CQI and ACK/NACK information 115a in a multiplexing circuit 116.

In scheduler 100, information from the receiving station corresponding to each of the plurality of users is aggregated, and transmission priority is determined in consideration with a space propagation condition known from the individual CQI, a retransmission condition known from the ACK/NACK, a data amount retained in memories $10_1$-$10_n$, etc.

Also, from the CQI, a transmittable maximum data amount is obtained. Then, in regard to a user i having obtained a right to transmit, it is controlled to read out the transmittable maximum number of data from memory $10_i$ in which the data concerned is stored, via a MIMO multiplexing/beamforming selection & AMC set section 101.

In MIMO multiplexing/beamforming selection & AMC set section 101, there are set MIMO multiplexing or beamforming and coding and modulation systems appropriately modified according to the propagation condition.

Finally, user allocation information, MIMO multiplexing/beamforming selection information, adaptive modulation information, etc. having been set in AMC set section 101 are forwarded to scheduler management information generation section 102.

When the data are read out from memories $10_1$-$10_n$, next, in an MAS (multi-antenna system) selection section 113, whether to perform transmission by beamforming or MIMO multiplexing is selected according to MIMO multiplexing/beamforming selection and the set information in AMC set section 101. As the criterion thereof, sufficiently, it may be decided to perform beamforming if the CQI value is relatively bad. Alternatively, by obtaining the space correlation between the transmission antennas using the channel matrix H, it may sufficiently be decided to perform beamforming if the correlation value is high. To decide strictly, it may also be possible to decide using the channel matrix H.

As an example, a 2×2 channel matrix H is shown in expression (10).

[12]

$$H = \begin{bmatrix} h_{11} & h_{12} \\ h_{21} & h_{22} \end{bmatrix} \quad (10)$$

The CQI information calculated and fed back in the receiver on the receiving station side is generated on the basis of the SINR of each transmission antenna ANT1, ANT2, and largely depends on the square norm of the column vector of the channel matrix H representing the space propagation condition of each transmission antenna. As an example, the space condition of the transmission antenna ANT1 is represented by expression (11).

[13]

$$k_1 = |h_{11}|^2 + |h_{21}|^2 \quad (11)$$

In contrast, as a solution obtained from expressions (7), (8), a square of the largest value among the singular values of the solution obtained by performing singular value decomposition (SVD) on the H matrix signifies the space propagation condition when being beamformed by a plurality of transmission antennas.

Expression (12) shows the solution of SVD, and expression (13) shows a parameter corresponding to expression (11).

[14]

$$H = \begin{bmatrix} h_{11} & h_{12} \\ h_{21} & h_{22} \end{bmatrix} = U \begin{bmatrix} \sqrt{\lambda_1} & 0 \\ 0 & \sqrt{\lambda_2} \end{bmatrix} V^H \quad (12)$$

$$k_{total} = \max(\lambda_1, \lambda_2) \quad (13)$$

Additionally, in regard to the spatial correlation described earlier, if the correlation is high, a ratio between the largest singular value and other singular values becomes greatly different from 1. Here, using the ratio between expression (11) and expression (13), an SINR to be obtained when the beamforming is performed is estimated and then converted into CQI, and thus, a transmittable data amount can be determined.

Through such the processing process, to AMC set section 101, MIMO multiplexing/beamforming selection and AMC setting are specified, and MAS selection is determined.

First, a case when the MIMO multiplexing is selected is described, and a case when the beamforming is selected follows next.

When the MIMO multiplexing is selected, based on the CQI information fed back on the basis of each transmission antenna, a data amount transmittable by each transmission antenna is distributed by means of a data S/P conversion section 104. Next, coding is performed in encoders 105a, 105b so as fit to each transmission data stream, and modulation is made in modulators 106a, 106b.

The outputs of modulators 106a, 106b are weighted in weighting circuits 107a, 107b, respectively, with the same fixed value as a transmission weight, so as to generate the data channel. Here, in case of the value by which the power is normalized with the number of transmission antennas N,

[15]

$$1/\sqrt{N}$$

may be weighted.

When the beamforming is selected, coding is performed by an encoder 105c and modulation is performed by a modulator 106c, each being fit to a single data stream. Then, the output data of modulator 106c is copied in a reproducer 108, and a data channel is generated by weighting the transmission weight Wtx of the ZF solution, obtained from the channel matrix H of the feedback information in weighting circuits 107a, 107b, corresponding to each transmission antenna ANT1, ANT2.

Next, the data channel is orthogonally multiplexed with another channel in a parallel-to-serial (P/S) conversion sections 109a, 109b.

Additionally, as to a pilot channel A, a specific pattern to the transmitting station is generated in a pilot generation section 120. Then, after controlled to orthogonalize between the transmission antennas in an orthogonalizing circuit 121, the pilot channel A is generated by performing modulation known in the receiving station in modulation sections 122a, 122b.

On the other hand, a scheduler management channel B, after the content specified by scheduler 100 is arranged in a scheduler management information generation section 102, in modulation sections 123a, 123b, the scheduler management channel B is generated by performing modulation known in the receiving station. Next, the channel orthogonally multiplexed in parallel-to-serial (P/S) conversion sections 109a, 109b are up-converted to carrier frequencies in transmission RF sections 124a, 124b, and radiated from the antennas ANT1, ANT2.

Now, the configuration of the above scheduler 100, MIMO multiplexing/beamforming selection & AMC set section 101 and scheduler management information generation section 102 are described in more detail.

Figure 12:
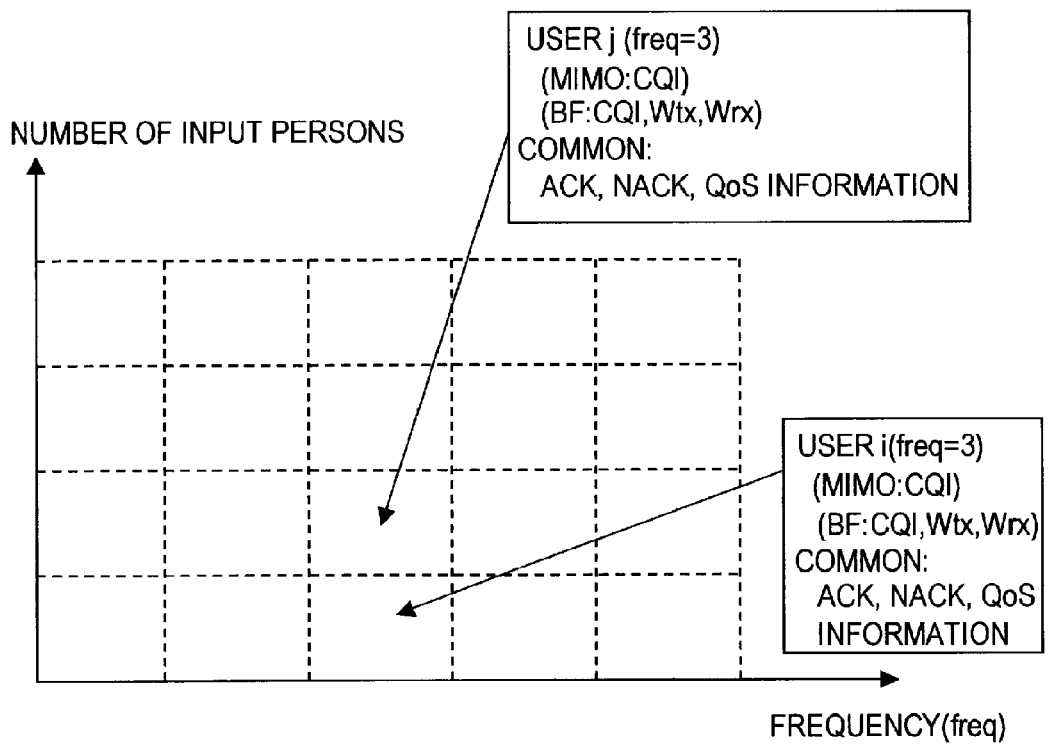
FIG. 12 shows a diagram explaining input information to a scheduler in a transmitting station.
Figure 13:
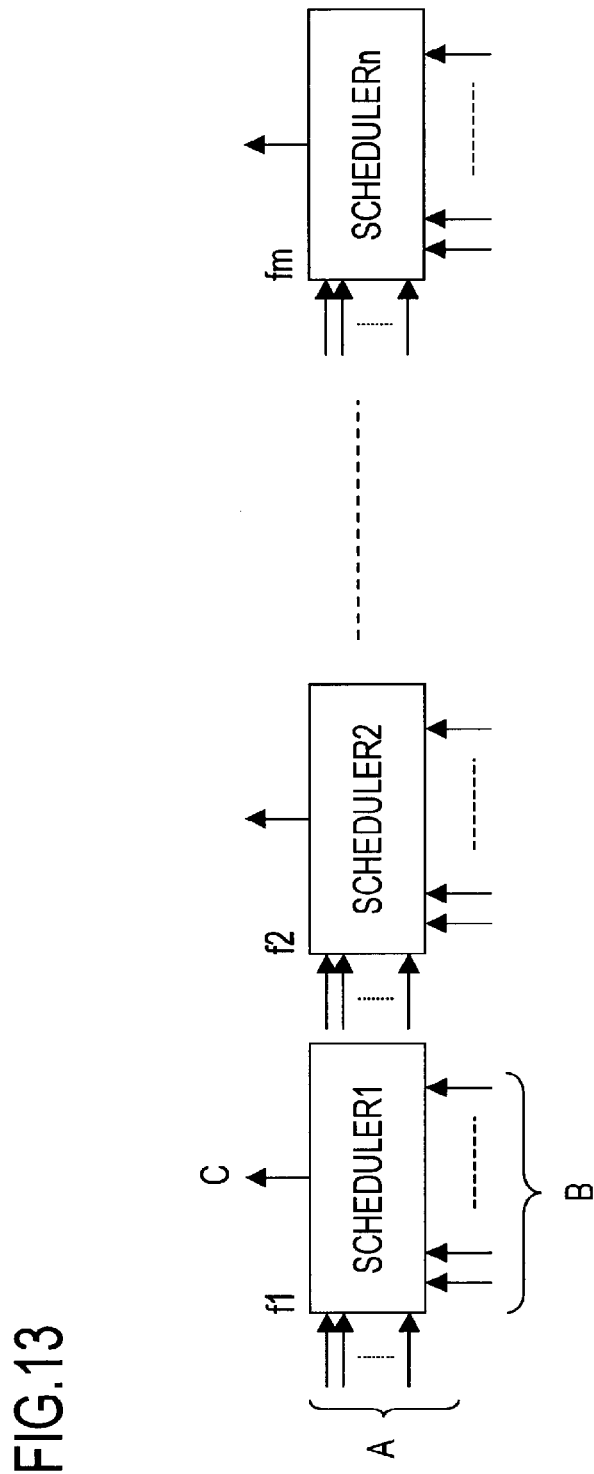
FIG. 13 shows an exemplary configuration of a scheduler.

FIG. 12 shows a diagram explaining input information to scheduler 100. Also, FIG. 13 shows an exemplary configuration of scheduler 100.

In FIG. 12, a state that a certain user i desires a frequency domain 3. At that time, there are conveyed CQI information when using the MIMO multiplexing, CQI information when using the beamforming, transmission and reception weight in formation Wtx, Wrx reported by scheduler 100, and further, ACK/NACK and QoS information as common information.

Here, as will be apparent from other embodiments described later, it is possible that the weight information may be the transmission weight information Wtx only.

Also, the QoS information is transmission priority determined from a transmission signal type such as voice, packet, etc. and a data amount retained in the transmission queue, and is managed by the upper layer of the transmitting station, and reported therefrom.

As shown in FIG. 12, another user j also issues a communication request in the same frequency domain 3, which is in an information input condition of the desire of using the frequency domain 3 as the second input number of persons (number of users). Corresponding thereto, scheduler 100 includes a plurality of schedulers 1-$n$ as shown in FIG. 13, into which QoS information A of a user desiring the corresponding frequency domain is input, and also, feedback information B from the receiving stations of the users desiring the corresponding frequency domains is input.

Based on the above information collected from the plurality of users, the most appropriate user selection is performed on the frequency-by-frequency basis. As to the methods of the above user selection, for example, it is possible to apply a technique described in TR25.848 of the 3GPP documents, such as RR (Round Robin) method, (Proportional Fairness) method and Max-CIR method.

Figure 14:
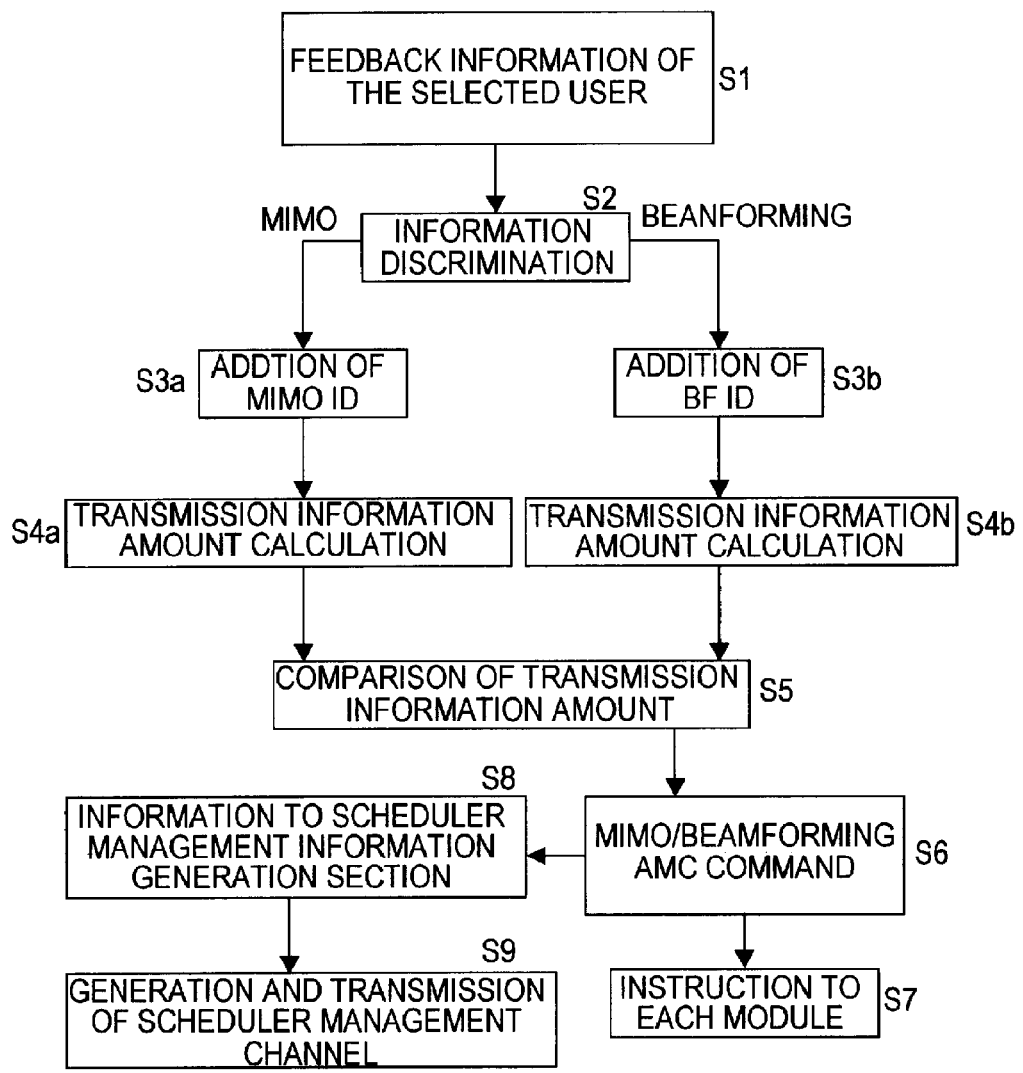
FIG. 14 shows a diagram illustrating a scheduler processing flow.

Next, with attention directed to the frequency domain 3, description is made according to the processing flow shown in FIG. 14. First, user feedback information selected and to be fed back from the receiving station is regenerated in feedback information reception section 110 and forwarded to MIMO multiplexing/beamforming selection & AMC set section 101 (step S1).

MIMO multiplexing/beamforming selection & AMC set section 101 discriminates information necessary for the MIMO multiplexing from information necessary the beamforming (step S2), and after the discrimination, adds an ID to identify the selection of either the MIMO multiplexing or the beamforming (steps S3a, 3b), and calculates transmission information amount depending on each selected case (steps S4a, 4b).

Here, in the MIMO multiplexing, in order to transmit different data streams from the respective antennas, for example, when there are two transmission antennas, two CQI exist. On the other hand, in the beamforming, only one CQI exists because the same data stream is transmitted from the entire antennas with the phases varied by the weights.

Thus, a calculated throughput is obtained in the following manner.

In case of the MIMO multiplexing;

[16]

$$\sum_i trans[CQI_{MIMO}(i)] \quad (14)$$

In case of the beamforming;

[17]

$$trans[CQI_{BF}(0)] \quad (15)$$

In the above expression (14), "i" denotes an antenna i, and since the beamforming has only CQI for the entire antennas, a notation of 0 is shown. Also, "trans" signifies transformation from CQI to a transmittable information amount. By comparing the transmission information amount obtained from expressions (14), (15) (step S5), the method which can convey larger information amount is selected (step S6). As a tendency, the MIMO multiplexing comes to be selected in the vicinity of a transmitting station having a good propagation environment, and the beamforming comes to be selected in a cell edge having a bad propagation environment.

Next, according to the information of the selected system, the selection of the MIMO multiplexing and the beamforming and an AMC command corresponding thereto are reported to each module (step S7).

At the same time, the above information is reported to scheduler management information generation section 102 (step S8). Then, after being added to the scheduler management channel format shown in FIG. 3 in scheduler management information generation section 102, the information is reported to the receiving station (step S9).

Namely, in the scheduler management channel, according to the ID of the selected system, the MIMO multiplexing/beamforming designation is selected, and the AMC information is reflected in the respective systems, using the format shown in FIGS. 4, 5.

[Receiving Station]

In FIG. 11, a signal transmitted from the transmitting station is down-converted into a baseband in reception RF sections 200a, 200b, and then, in S/P conversion sections 201a, 201b, the orthogonal multiplexed channels are separated. As described earlier, the S/P conversion is applied because of being orthogonally time-multiplexed as an example, and however, it is possible to cope with other orthogonally multiplexed cases.

Using the separated pilot channel A, a propagation path variation is obtained in a channel estimation section 202.

At the same time, the demodulation of other channels is performed in a demodulation section 203, and feedback information is generated in a feedback information generation section 220.

To demodulate a data channel C, it is necessary to know information about adaptive modulation, and therefore, first, it is necessary to demodulate the scheduler management channel B. Since the modulation system of the scheduler management channel B is known in the receiving station, it is possible to demodulate the scheduler management channel B in demodulation section 203 by means of an MLD algorithm, etc., using the channel estimation value estimated from the pilot channel A.

The demodulated information of the scheduler management channel B is confirmed in a scheduler management information decision section 204, and a demodulation decision is made in a demodulation decision section 205 by deciding whether there is a data destined to the self-station in the present frame. The reason is that, if there is no data destined to the self-station, an effect of reducing power consumption in the receiving station is obtainable by omitting the demodulation operation.

Next, when there is a data destined to the self-station, MAS selection is decided in an MAS selection circuit 206 from the information of the scheduler management channel B, and a demodulation algorithm is separated according to the case of either MIMO multiplexed or beamformed.

First, demodulation and decoding in the case of the MIMO multiplexing are described, and thereafter, demodulation and decoding in the case of the beamforming are described.

Using the channel estimation value estimated from the pilot channel A, the MIMO multiplexed signal is demodulated in a demodulation section 207 by means of an MLD algorithm, etc., after the modulation information is known from the scheduler information.

After being demodulated, a signal for each transmission antenna is extracted, and coding information thereof on a stream-by-stream basis comes to be known from the scheduler information, and then, decoding corresponding thereto is performed in decoders 208a, 208b. By this, data streams are obtained, and the original data sequence is obtained by performing P/S conversion of the output of decoders 208a, 208b in a P/S converter 209. Finally, a decision whether the data has been transmitted correctly is made in a retransmission decision circuit 210.

The above decision in retransmission decision circuit 210 may be performed by an error decision using addition of CRC (cyclic redundancy check) information which has also been used conventionally. Here, the retransmission decision has been made after the data is rearranged by the P/S conversion in P/S converter 209. Instead, it is also possible to cope with by performing retransmission decision on the basis of transmission data stream, as will be described later.

On the other hand, to a beamformed signal, a reception antenna weight 211 of a ZF solution, calculated in advance in the transmitting station, is obtained from scheduler management information decision section 204, weighting thereof is performed. Thus, signal synthesis between the antennas is performed in an antenna synthesis section 212, and channel compensation is made in a demodulation section 213.

Then, in demodulation section 213, modulation information is known from the scheduler management information obtained from scheduler management information decision section 204, and demapping corresponding to the modulation system thereof is performed. After demodulation through the demapping, coding information is obtained from scheduler management information decision section 204, and corresponding decoding is performed in a decoding section 214. By this, a data is obtained, and finally, whether the data has been transmitted correctly is decided in retransmission decision section 210.

When retransmission decision section 210 decides that retransmission is not necessary, the data is output, and an ACK is returned as the feedback. When the retransmission is necessary, a NACK is returned. Also, when there is provided a retransmission function of high functionality, such as HARQ (hybrid auto-repeat request: a technique to enhance reception accuracy by utilizing a formerly transmitted signal at the time of retransmission), it may also be possible to store into a temporary buffer, not discard the received signal, and to synthesize at the time of next retransmission, thereby improving the reception quality.

Feedback information is generated in a feedback information generation section 220. For this purpose, as an output from channel estimation section 202, a channel matrix H 221 is obtained from the channel estimation value, and also SINR on the basis of each transmission antenna is calculated in an SINR calculation section 222. Then, CQI information, which is obtained in a CQI conversion section 223 through the CQI conversion of the above calculation result on the basis of each transmission antenna, and the above ACK/NACK decision output are converted in a feedback information conversion section 215 into feedback information, and given as ACK/NACK information 224.

In the SINR calculation, the calculation is made by obtaining a calculation result from expression (11) in regard to the calculation of a signal S, and also, in regard to noise N, by obtaining the dispersion of an instantaneous channel estimation value to an average channel estimation value in a short-time interval on the basis of each reception antenna.

Finally, feedback information arranged as feedback information 225 is modulated in a modulation section 226 with a predetermined modulation system. On the other hand, a separate pilot fed from a separate pilot channel generation section 227 is modulated in a modulator 228. The above two modulation outputs are orthogonally time-multiplexed in a P/S conversion section 229, up-converted into a carrier frequency in a transmission RF section 230, and then radiated from the antenna.

In FIG. 11, in regard to a link from the receiving station toward the transmitting station, the figure is illustrated in the form of transmitting from a single antenna ANT for simplification. However, it is also possible to cope with a method of transmitting using a plurality of antennas implemented on the receiving station.

Additionally, in the figure of the receiving station, each line having an added oblique line signifies that information flows in parallel.

Embodiment 2

Figure 15:
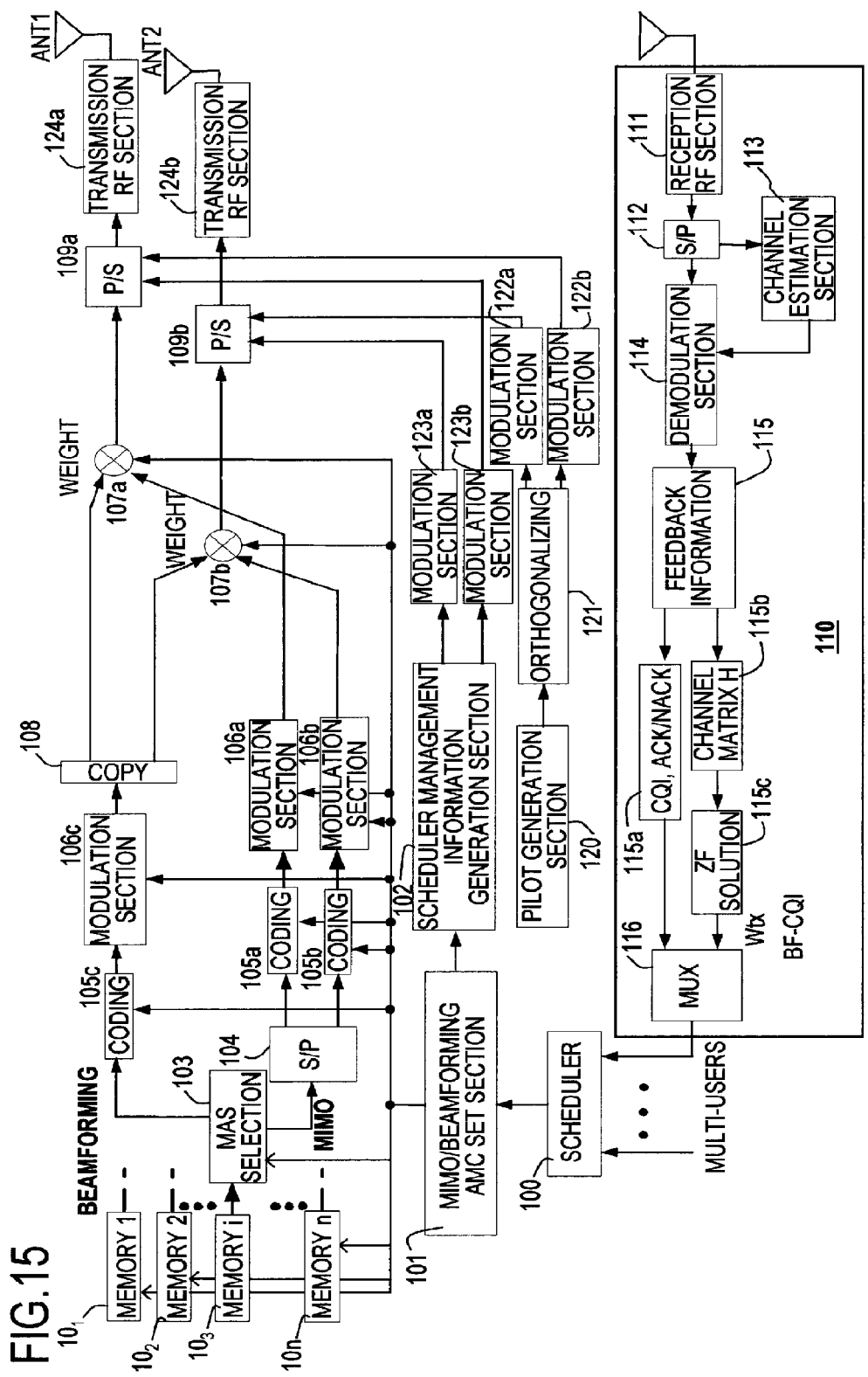
FIG. 15 shows a diagram illustrating an exemplary configuration of a transmitting station corresponding to an embodiment 2 corresponding to a group 2 in Table 1, as an embodiment 2.
Figure 16:
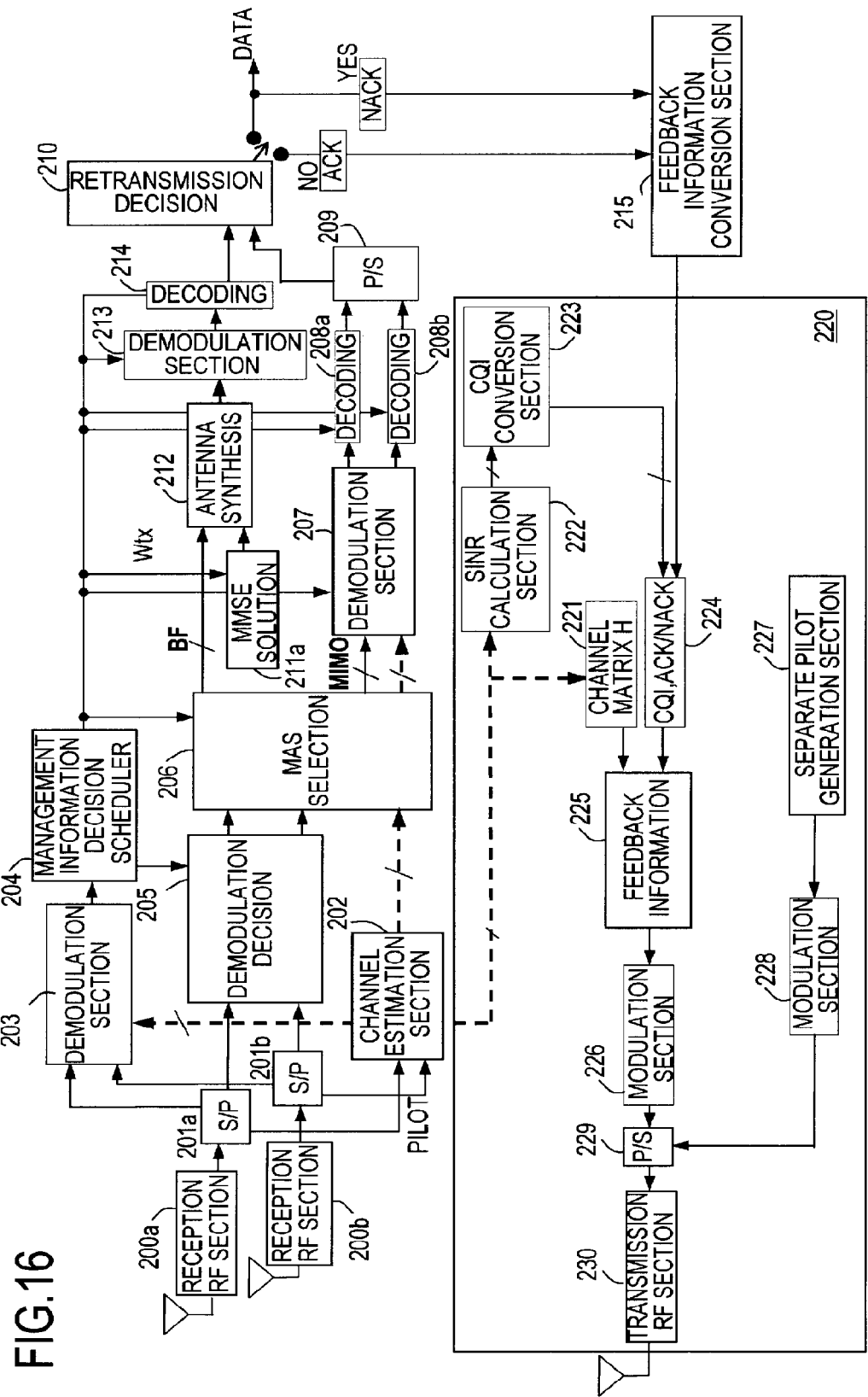
FIG. 16 shows a diagram illustrating an exemplary configuration of a receiving station corresponding to the transmitting station of an embodiment 2 corresponding to a group 2 in Table 1.

Next, an embodiment 2 corresponding to the group 2 in Tables 1, 2 is described. FIGS. 15 and 16 show exemplary configurations of a transmitting station and a receiving station, respectively, corresponding to the embodiment 2.

[Transmitting Station]

In FIG. 15, description is made with attention directed to the points of difference from the transmitting station according to the embodiment 1 shown in FIG. 10. The feature of the transmitting station corresponding to the embodiment 2 shown in FIG. 15 lies in that only information is reflected in scheduler 100 when the ZF solution is obtained from the channel matrix H fed back from the receiving station.

Also, because of a configuration reporting only the transmission weight $W_{tx}$, it is different from the embodiment 1 in that a weight reported from scheduler management information generation section 102 is performed using $W_{tx}$.

[Receiving Station]

Corresponding to the above modification in the transmitting station, the configuration of the receiving station is also different. According to the configuration of the receiving station in the embodiment shown in FIG. 11, when the beamforming is selected, the reception weight Wrx is reported using the information from scheduler management information decision section 204, and by the adaptation thereof, it was possible to performed antenna synthesis by means of the pseudo ZF solution 211.

In contrast, according to the embodiment 2 shown in FIG. 16, since the transmission weight Wtx is reported from scheduler management information decision section 204, using the channel estimation value obtained in channel estimation section 202 from the pilot channel A and the above transmission weight Wtx, an MMSE solution obtained from the aforementioned expression (9) is obtained in an MMSE solution calculation section 211a.

It is configured that the antenna synthesis is made using the above reception weight. As compared with the method of the group 1, a calculation amount in the receiving station increases to some extent. However, it is possible to improve the characteristic because channel variation deterioration caused by a feedback delay and noise emphasis is eliminated.

Embodiment 3

Figure 17:
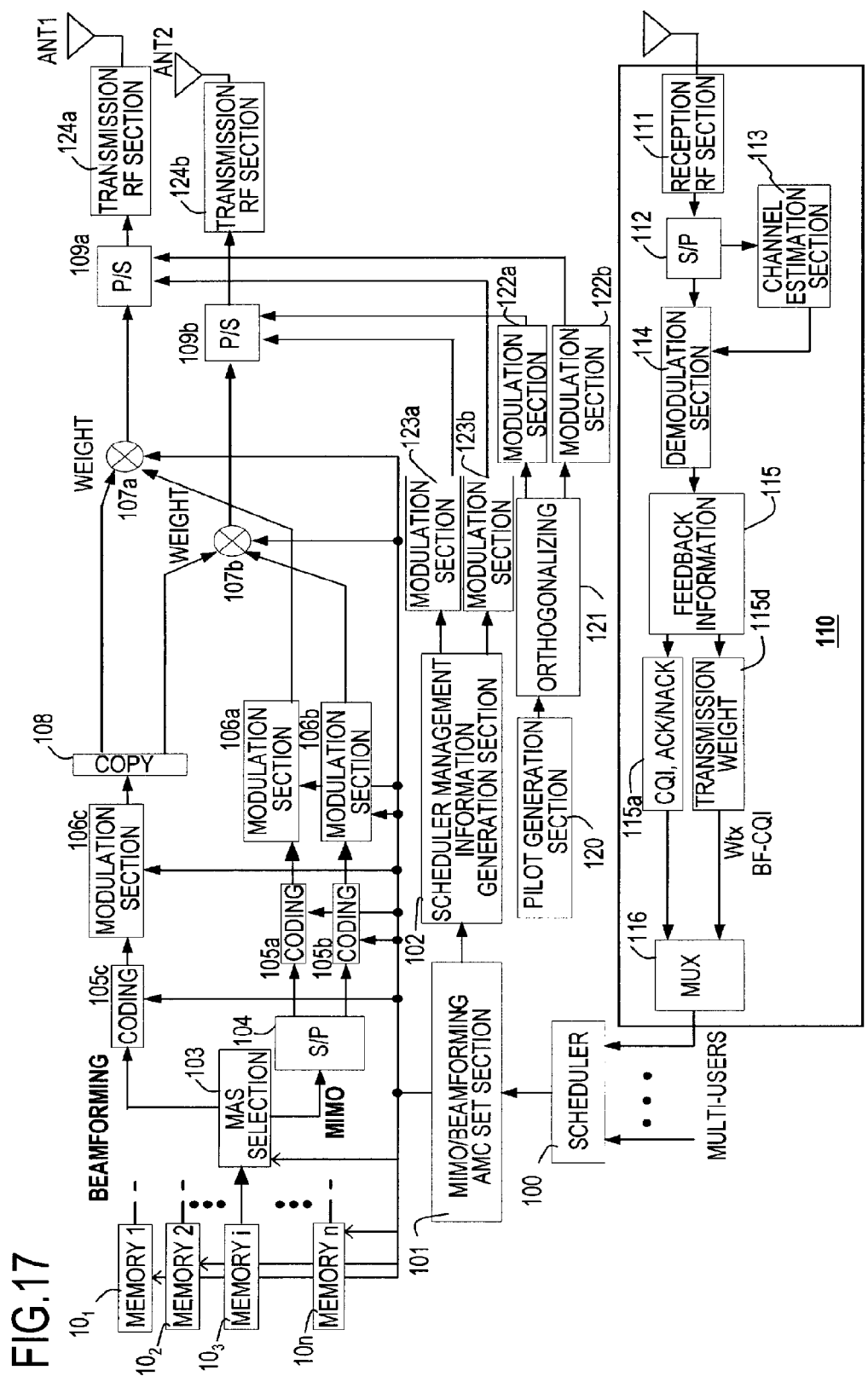
FIG. 17 shows a diagram explaining a transmitting station in an embodiment 3 corresponding to a group 3 in Table 1.
Figure 18:
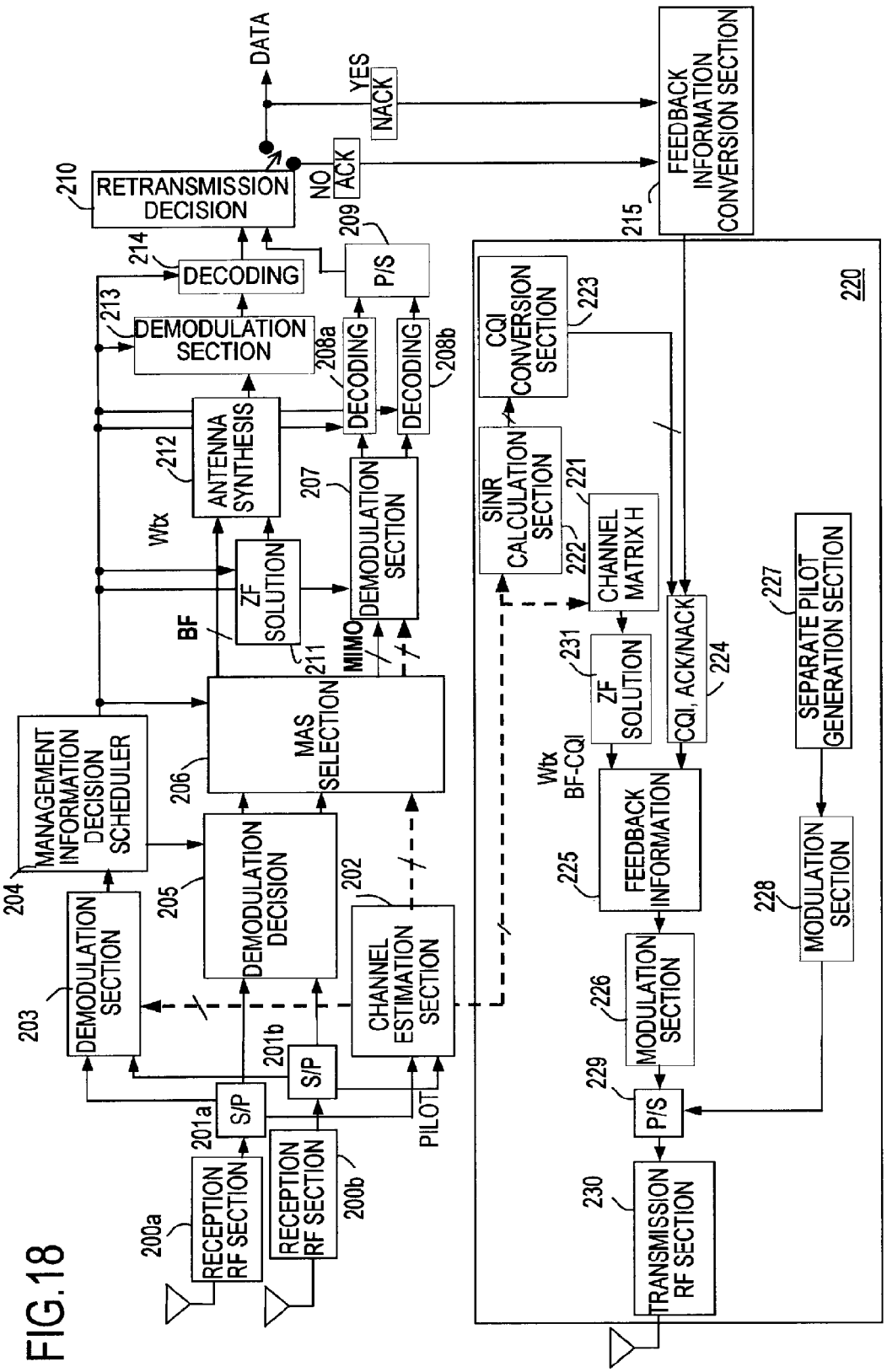
FIG. 18 shows a diagram explaining a corresponding receiving station in an embodiment 3 corresponding to a group 3 in Table 1.

An embodiment 3 corresponding to the group 3 shown in Tables 1, 2 is described. FIGS. 17 and 18 show exemplary configurations of a transmitting station and a receiving station, respectively, corresponding to the embodiment 3.

[Transmitting Station]

As compared to the embodiment 2, in the embodiment 3, there is a difference only in the point that the information to be fed back is not the channel matrix H but a transmission weight (Wtx) 115d. As an improved point, the information amount to be fed back can be reduced. Also, as an advantageous point, it is also possible to point out that the calculation amount in the transmitting station can be reduced.

[Receiving Station]

In the receiving station, as contrasted with the receiving station configuration of the embodiment 2 shown in FIG. 16, there is a difference in that, in regard to the information to be fed back, a ZF solution 231 obtained from the channel matrix H 221 by use of expressions (7), (8) is calculated, and the transmission weight Wtx is fed back. This will increase the calculation amount in the receiving station, and however, the information amount to be fed back is reduced, and corresponding to the above amount, it is possible to generate an area to be allocated to a data channel from the receiving station to the transmitting station.

Embodiment 4

Figure 19:
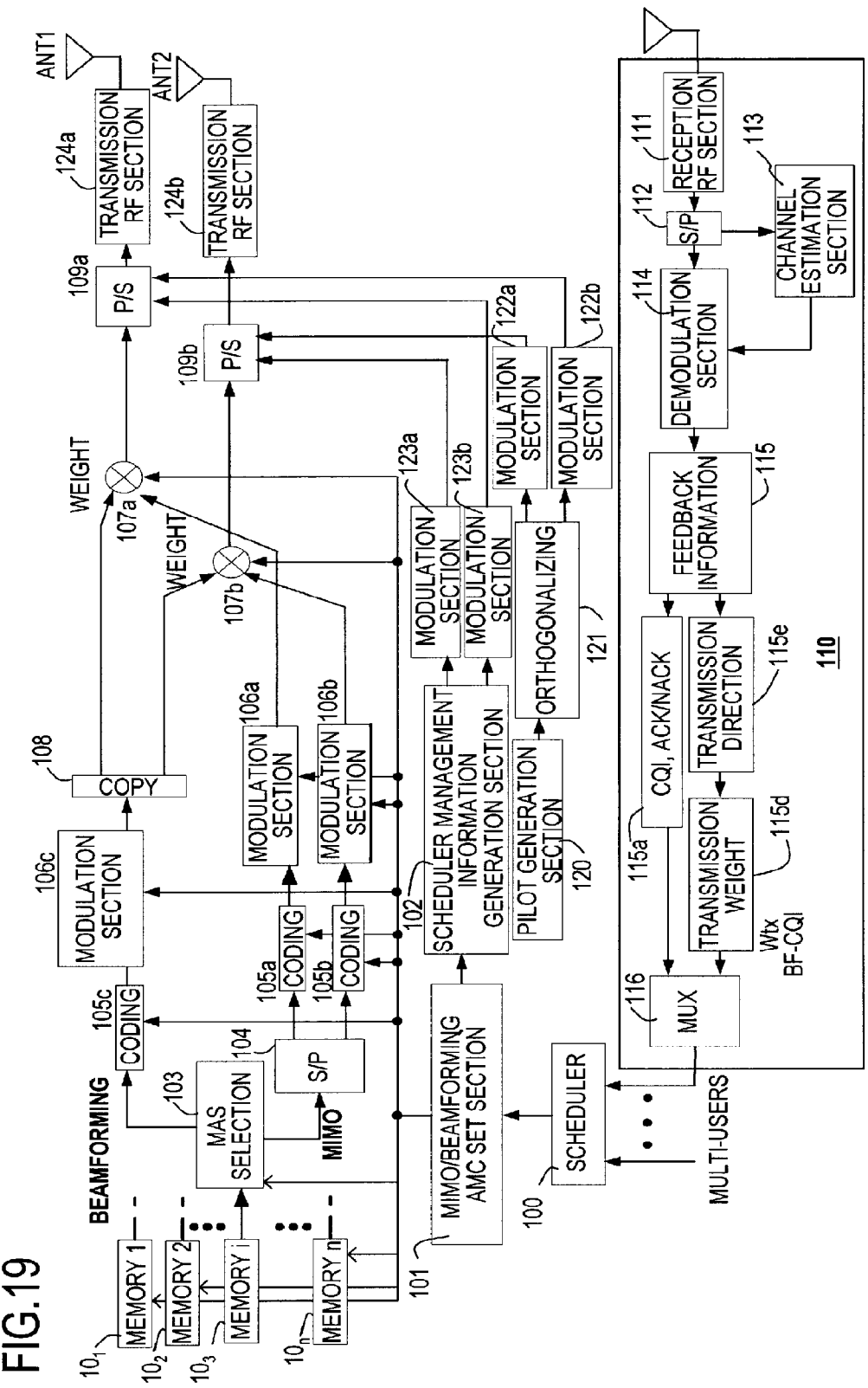
FIG. 19 shows a diagram explaining a corresponding transmitting station in an embodiment 4 corresponding to a group 4 in Table 1.
Figure 20:
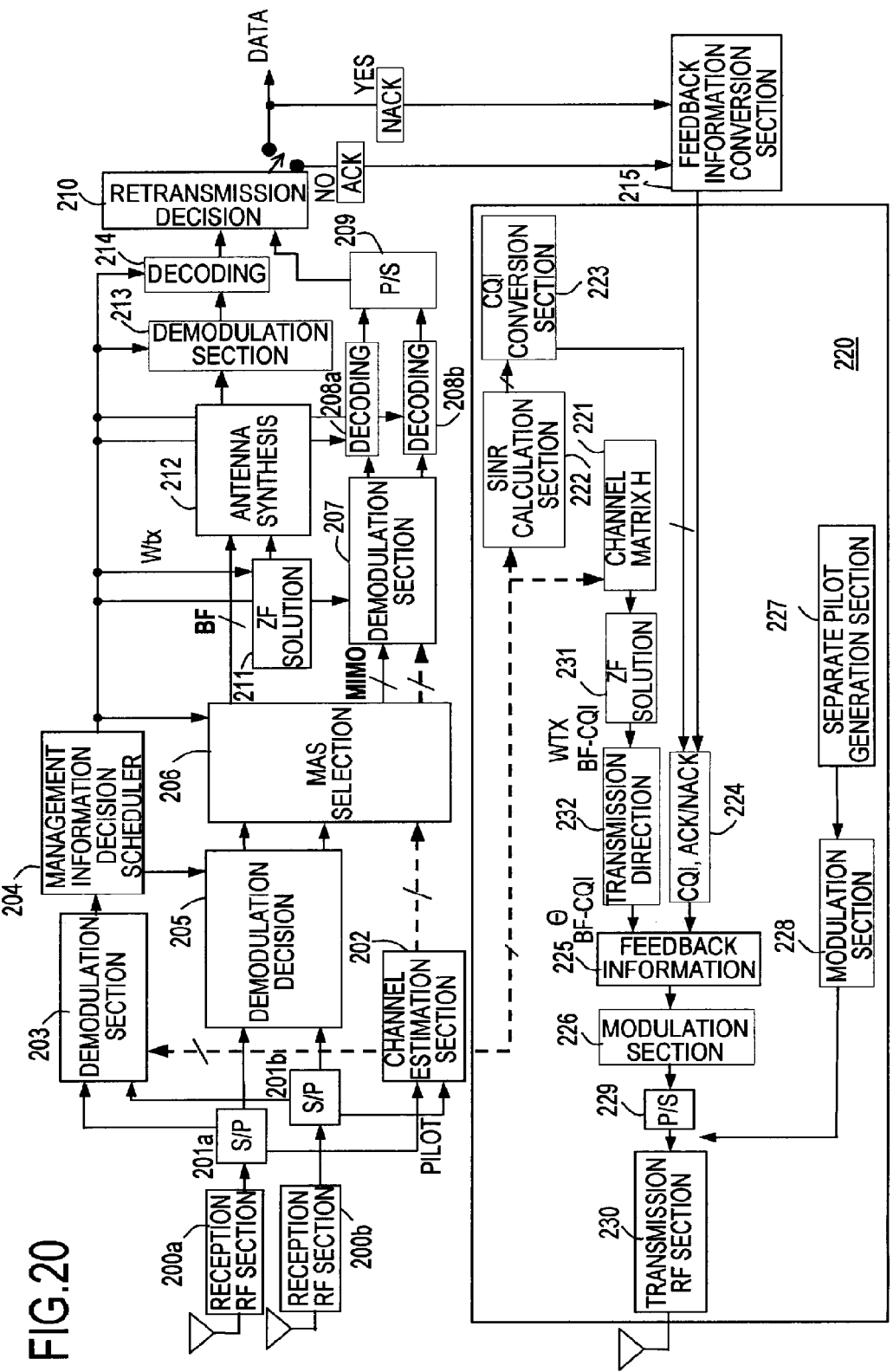
FIG. 20 shows a diagram explaining a corresponding receiving station in an embodiment 4 corresponding to a group 4 in Table 2.

An embodiment 4 corresponding to the group 4 shown in Tables 1, 2 is described. FIGS. 19 and 20 show exemplary configurations of a transmitting station and a receiving station, respectively, corresponding to the embodiment 4.

[Transmitting Station]

As contrasted with the transmitting station configuration of the embodiment 3 shown in FIG. 17, in the transmitting station according to the embodiment 4, the information to be fed back is not the transmission weight Wtx, but a transmission direction 115e. It is an improved point that the reduction of the information amount to be fed back can be attained. In regard to the above transmission direction 115e, a peak value in the beam pattern of the transmission weight in the ZF solution obtained from expressions (7), (8) is used, and further, by quantizing as shown in FIG. 9, the feedback amount can be reduced. In addition, when the transmission direction 115e is received as feedback information, a beam pattern is generated so that the power is concentrated maximally to the direction concerned. An appropriate transmission weight (Wtx) 115d is generated and reported to scheduler 100.

[Receiving Station]

In the receiving station, as contrasted with the receiving station configuration of the embodiment 3 shown in FIG. 18, a transmission weight Wtx of ZF solution 231 is obtained as feedback information, and thereafter, a peak value (θ) of transmission direction 232, to which the power of the beam pattern generated by the above weight is concentrated, is obtained and fed back.

Embodiment 5

Figure 21:
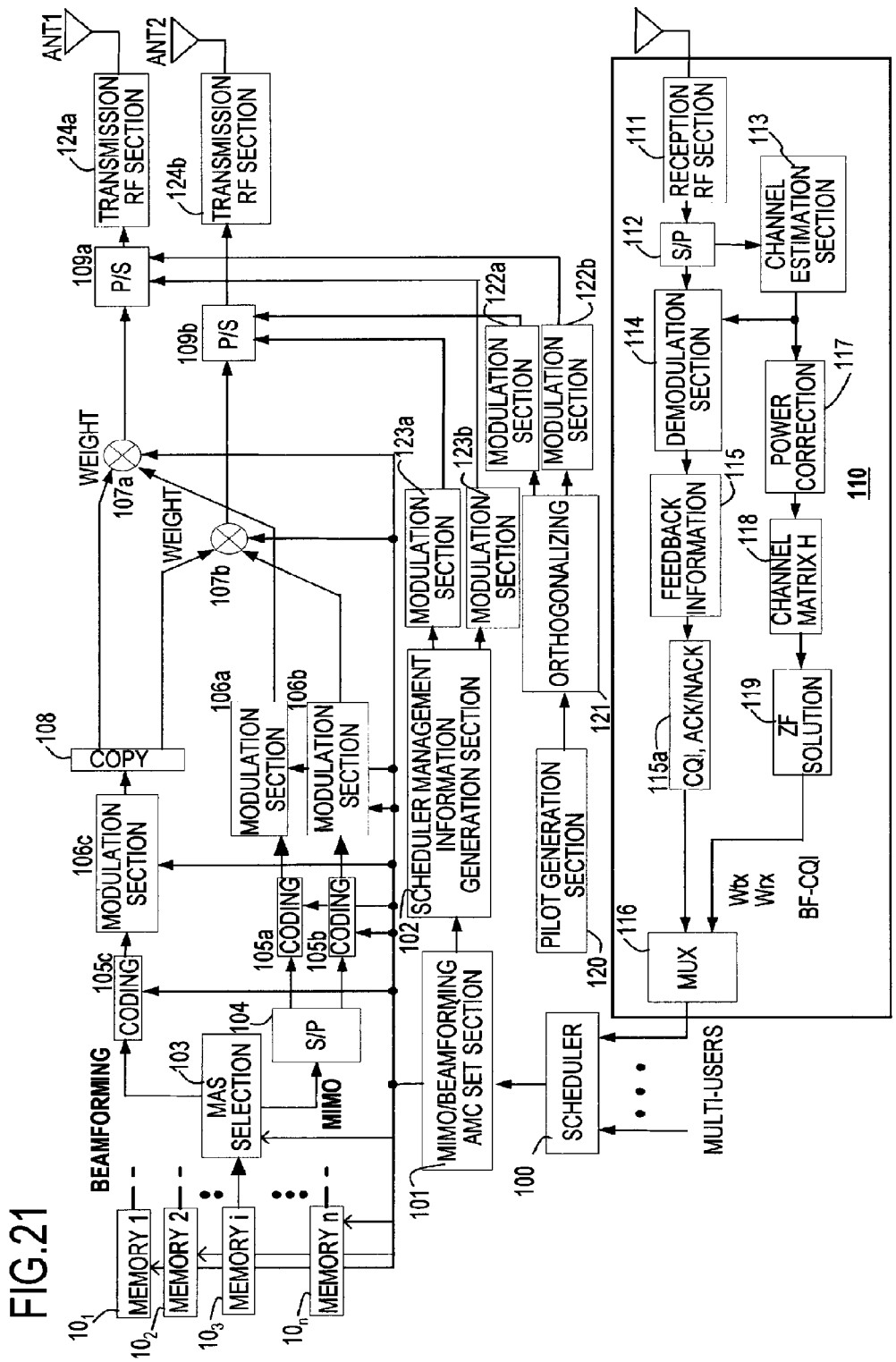
FIG. 21 shows a diagram explaining a corresponding transmitting station in an embodiment 5 corresponding to a group 5 in Table 2.
Figure 22:
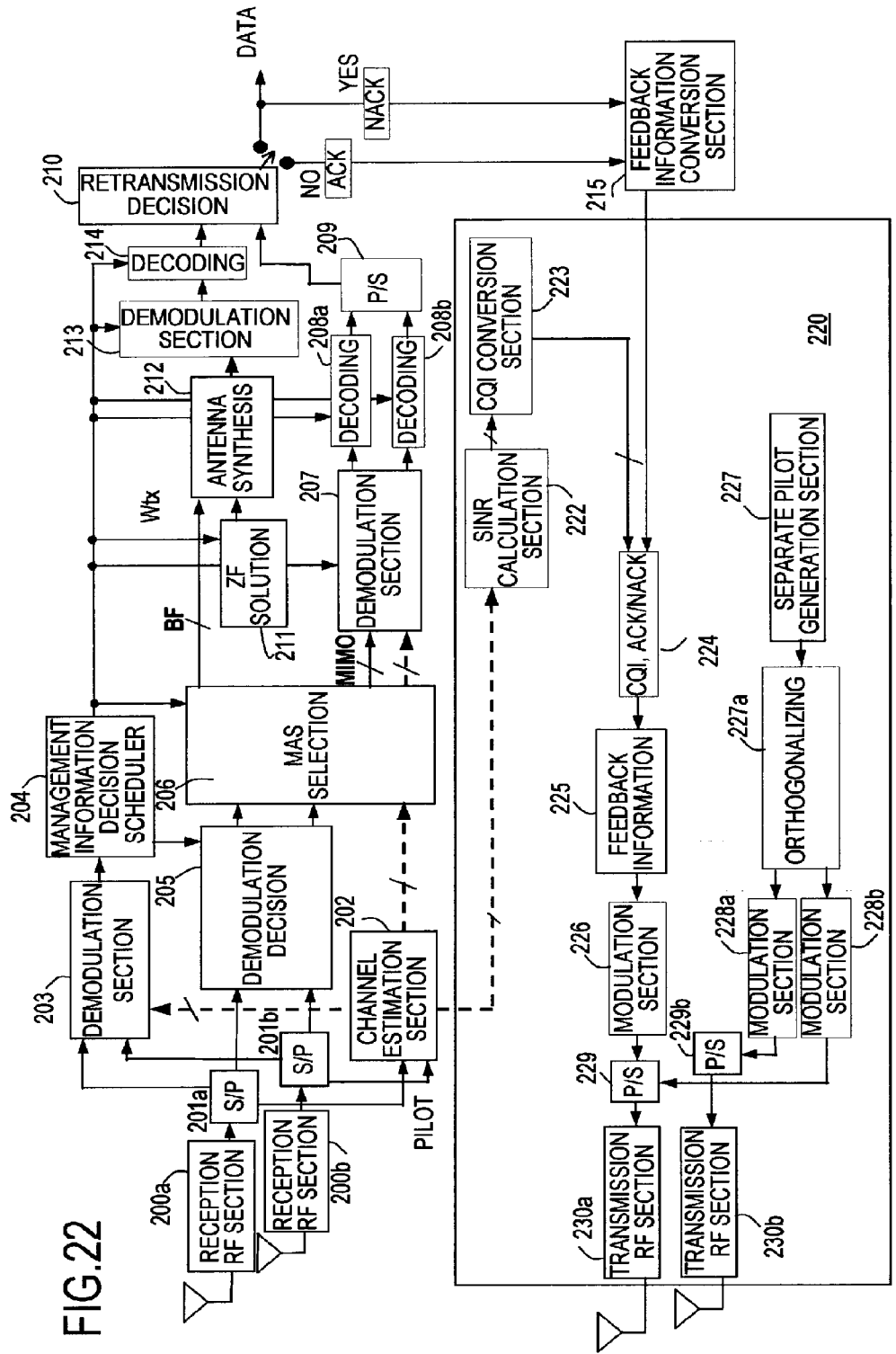
FIG. 22 shows a diagram explaining a corresponding receiving station in an embodiment 5 corresponding to a group 5 in Table 2.

An embodiment 5 corresponding to the group 5 shown in Tables 1, 2 is described. FIGS. 21 and 22 show exemplary configurations of a transmitting station and a receiving station, respectively, corresponding to the embodiment 5.

[Transmitting Station]

The transmitting station corresponding to this embodiment 5 shown in FIG. 21 is an example of switching between the MIMO multiplexing and the beamforming by means of TDD. As compared with the transmitting station of the embodiment 1 shown in FIG. 10, a feature is that a channel estimation value from the receiving station to the transmitting station is obtained in channel estimation section 113, and based on the above estimated value, power difference between the transmitting station and the receiving station is corrected in a power correction circuit 117, so as to generate a channel matrix 118 from the transmitting station to the receiving station. Next, as a feature, the reception weight Wrx of the receiving station is generated by obtaining a ZF solution 119 using the generated channel matrix 118.

Because of TDD using the same frequency band, it is possible to estimate the propagation path characteristic on one side using a propagation path characteristic on the other side if a link switchover from the transmitting station to the receiving station and a link switchover from the receiving station to the transmitting station are made so as to sufficiently track to the fading. By this, it is possible to make the feedback information amount necessary for transmission beamforming zero.

[Receiving Station]

As contrasted with the receiving station configuration of the embodiment 1 shown in FIG. 11, the receiving station does not require the feedback information excluding CQI and ACK/NACK information 224. However, instead of feeding back the information of the channel matrix H, an orthogonalization section 227a is provided for orthogonalizing separate pilot channels generated in a separate pilot channel generation section 227 from the entire antennas provided in the receiving station. The orthogonalized separate pilot channels are transmitted to the entire antennas (two antennas in FIG. 22) provided in the receiving station.

Additionally, as to the feedback information, it may be possible to transmit from one antenna, or the entire antennas may be used. However, as a different point, as to the separate pilot, it is necessary to orthogonalize and transmit from the entire antennas.

Embodiment 6

Figure 23:
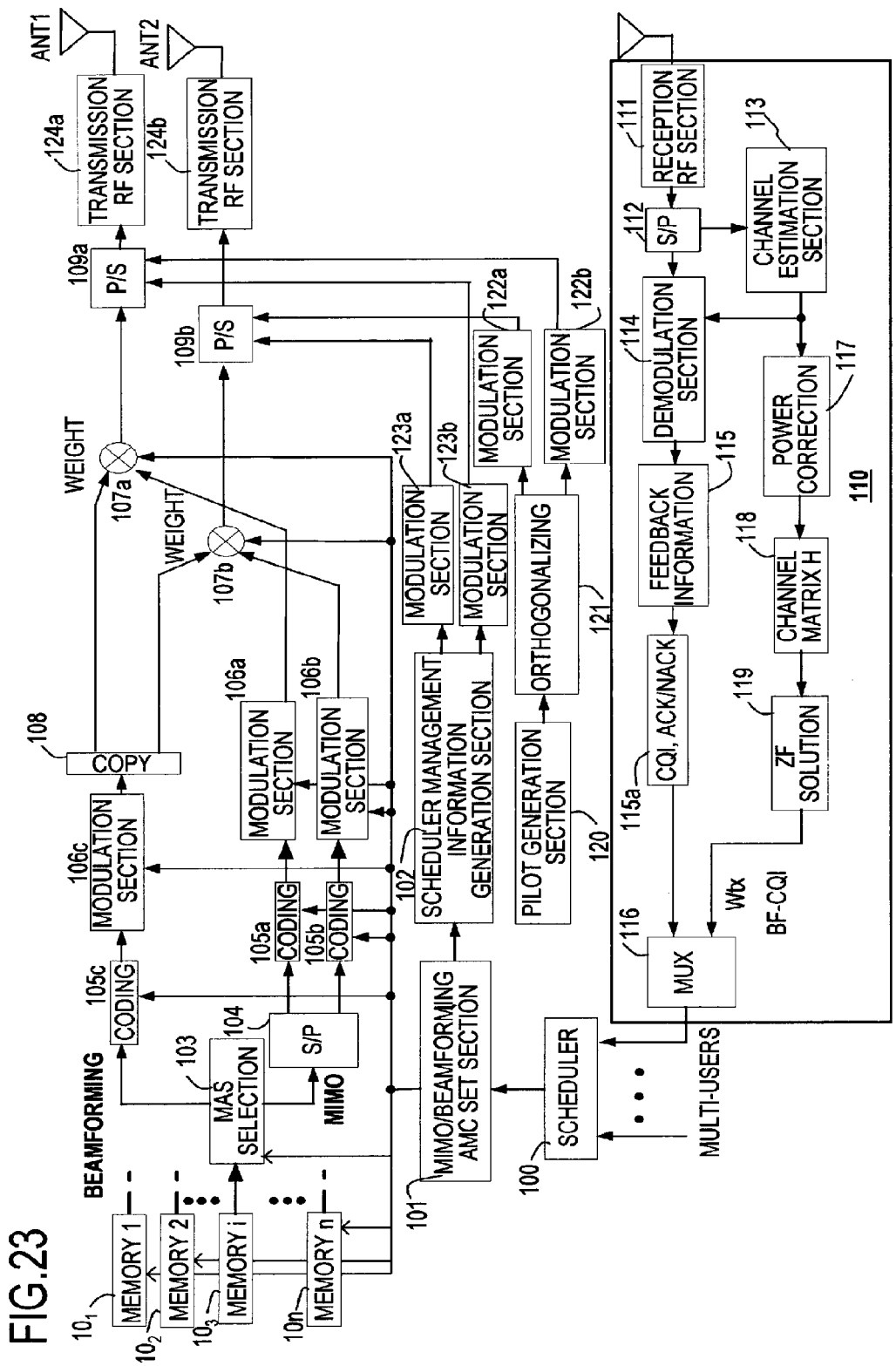
FIG. 23 shows a diagram explaining a corresponding transmitting station in an embodiment 6 corresponding to a group 6 in Table 2.
Figure 24:
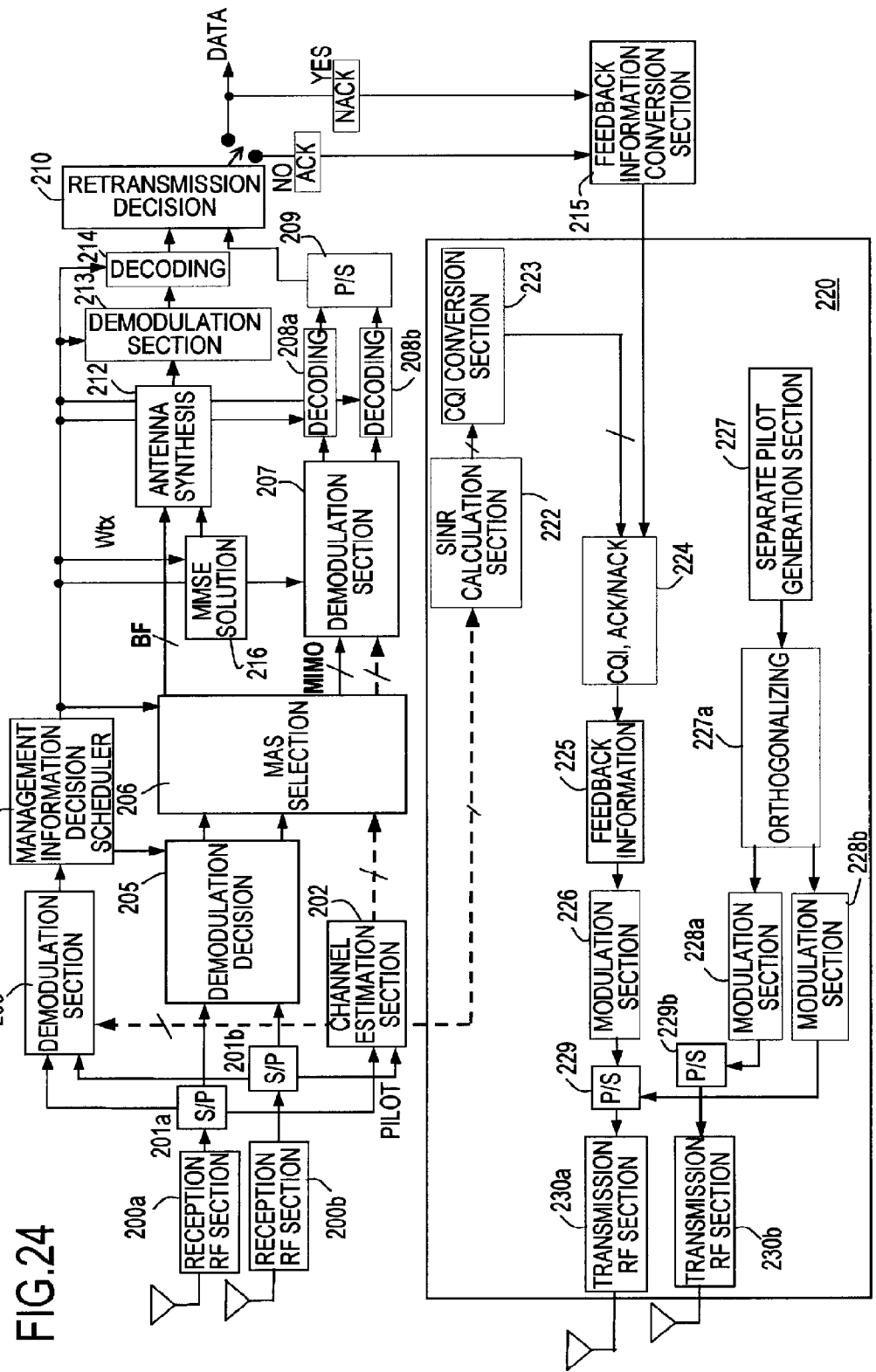
FIG. 24 shows a diagram explaining a corresponding receiving station in an embodiment 6 corresponding to a group 6 in Table 2.

An embodiment 6 corresponding to the group 6 shown in Tables 1, 2 is described. FIGS. 23 and 24 show exemplary configurations of a transmitting station and a receiving station, respectively, corresponding to the embodiment 6.

[Transmitting Station]

As contrasted with the transmitting station of the embodiment 5 shown in FIG. 21, a feature lies in a point that only the transmission weight Wtx information is reflected in multi-user scheduler 100 when obtaining ZF solution 119 of channel matrix H 118 obtained from the channel estimation value of the separate pilot channel from the receiving station to the transmitting station.

Also, because of reporting only the transmission weight Wtx, the weight to be reported in scheduler management information generation section 102 is reported using Wtx.

[Receiving Station]

As contrasted with the receiving station configuration of the embodiment 5 shown in FIG. 22, as a different point, the receiving station obtains an MMSE solution 216 when the beamforming is specified in MAS selection section 206. Further, as a feature of the receiving station shown in FIG. 22, there is applied the same content described as the point of difference in the receiving station of the embodiment 2 shown in FIG. 16 from the receiving station of the embodiment 1 shown in FIG. 11.

Here, in the aforementioned embodiments 1 through 6, in regard to the transmission data stream of the MIMO multiplexing, the description has been made in such a mode as retransmitting on a block-by-block basis of a single transmission opportunity for the entire antennas.

Figure 25:
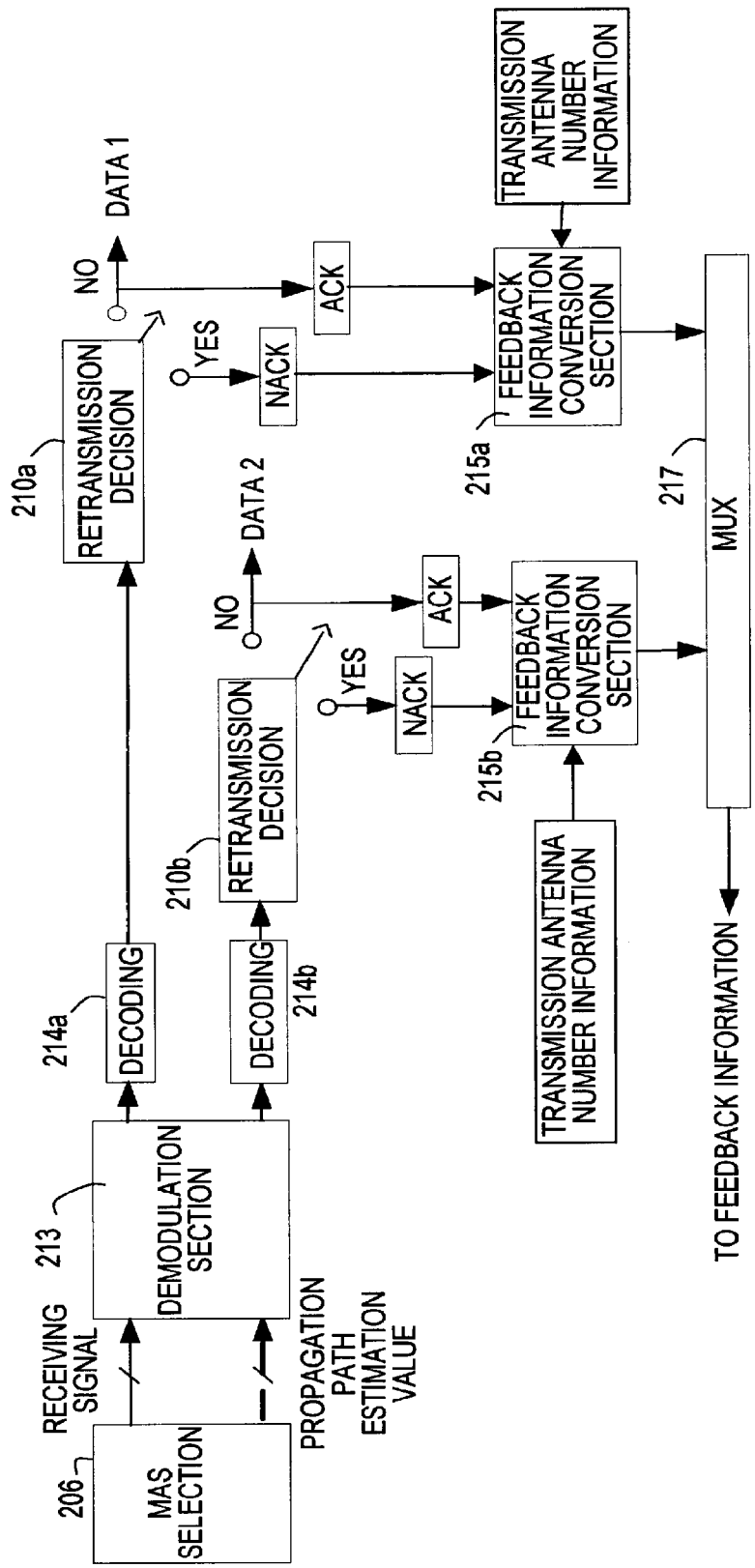
FIG. 25 shows a diagram illustrating another configuration of a demodulation section and thereafter, in a receiving station corresponding to antenna data stream retransmission control.

However, it may also be possible to performing retransmission control on the basis of each data stream of the antenna. In this case, in FIG. 25 illustrating the configurations of the demodulation section 213 and thereafter of the receiving station, the configurations of the decoding section and thereafter are required correspondingly to the respective antennas. Number information of each antenna corresponding to feedback information conversion sections 215a, 215b is input. Then, in a multiplexing section 217, feedback information in regard to the entire antennas is multiplexed and output.

INDUSTRIAL APPLICABILITY

As having been described above, according to the present invention, it is possible to obtain a concrete configuration by making full use of the technical features of the MIMO multiplexing and the beamforming, enabling instantaneous switching of the both by devising the common scheduler management channel using a single common pilot only.

Additionally, in the above description of the embodiments, the MIMO multiplexing and the beamforming are exemplified, and however, using the similar device, it is also possible to develop to switchover among MIMO multiplexing, coded transmission diversity, and beamforming, etc.

What is claimed is:

1. A transmitting station in a radio system performing scheduled transmission to a plurality of user terminals comprising:

a plurality of antennas;

a reception unit configured to obtain reception quality information estimated from a pilot channel among information fed back from each of the plurality of user terminals, to determine based on the obtained reception quality information, either one transmission system of Multi Input Multi Output (MIMO) and beamforming for the plurality of antennas; and a transmission unit configured to add a specific bit which identifies the determined transmission system to a first bit area in a scheduler management channel, and to vary contents in the other bit area in the scheduler management channel, as corresponding to the specific bit, and further transmit the scheduler management channel to the plurality of user terminals; wherein the transmitting station is further configured to use the other bit area in the scheduler management channel for providing modulation information according to a number of streams when the determined transmission system is Multi Input Multi Output, and for providing modulation information and weight information when the determined transmission system is beamforming.

* * * * *